United States Patent [19]

Salmon

[11] Patent Number: 5,936,855
[45] Date of Patent: Aug. 10, 1999

[54] HARMONIC CORRECTION OF 3-PHASE RECTIFIERS AND CONVERTERS

[75] Inventor: John C. Salmon, Edmonton, Canada

[73] Assignee: Mercury Electric Corporation, Calgary, Canada

[21] Appl. No.: 08/707,184

[22] Filed: Sep. 3, 1996

[51] Int. Cl.$^6$ .................................................. H02M 1/12
[52] U.S. Cl. ................................ 363/46; 363/51
[58] Field of Search ............................ 363/37, 45, 46, 363/51, 54, 138, 162

[56] References Cited

U.S. PATENT DOCUMENTS

| | | | |
|---|---|---|---|
| 3,781,645 | 12/1973 | Grom et al. ................................ | 321/45 |
| 4,499,534 | 2/1985 | Schnetzka et al. ...................... | 363/129 |
| 4,700,372 | 10/1987 | Tsuchiya .................................. | 363/138 |
| 4,721,897 | 1/1988 | Matsuse et al. ......................... | 363/37 |
| 4,841,216 | 6/1989 | Okada et al. ............................. | 322/10 |
| 5,047,913 | 9/1991 | DeDoncker et al. ................... | 363/95 |
| 5,172,309 | 12/1992 | DeDoncker et al. ................... | 363/35 |
| 5,210,685 | 5/1993 | Rosa ........................................ | 363/109 |
| 5,214,371 | 5/1993 | Naidu ...................................... | 322/25 |
| 5,323,095 | 6/1994 | Kumar .................................... | 318/376 |
| 5,345,375 | 9/1994 | Mohan .................................... | 363/40 |
| 5,376,828 | 12/1994 | Kim et al. ................................ | 307/64 |
| 5,499,178 | 3/1996 | Mohan .................................... | 363/44 |
| 5,510,696 | 4/1996 | Naidu et al. ............................. | 322/29 |
| 5,515,264 | 5/1996 | Stacey .................................... | 363/132 |
| 5,574,636 | 11/1996 | Lee et al. ................................ | 363/132 |

OTHER PUBLICATIONS

Operating a Three–Phase Diode Rectifier with a Low–Input Current Distortion Using a Series–Connected Dual Boost Converter, John C. Salmon, IEEE Transactions on Power Electronics, vol. 11, No. 4, Jul. 1996, pp. 592–603. submitted for publication May 1994.

Reliable 3–Phase PWM Boost Rectifiers Employing a Stacked Dual Boost Converter Subtopology, John C. Salmon, IEEE Transactions on Industry Applications, vol. 32, No. 3, May/Jun., 1996, pp. 542–551, Conference date: Oct. 1994.

Harmonic Correction Circuits for VSI Drives using 3–phase Thyristor Networks, Dr. John C. Salmon, Emanuel Bocancea, Dr. Edwin Nowicki, IHSTED Conference Jun. 5–8, 1996, 4 pages, Conference Oct. 1995.

A low distortion 3–phase rectifier using a resonant–mode Y–connected thyristor network, Dr. John C. Salmon, Dr. Edwin Nowicki, IEEE Canadian Conference on Electrical & Computing Engineering, Sep. 5–8, 1995, 3 pages.

(List continued on next page.)

*Primary Examiner*—Peter S. Wong
*Assistant Examiner*—Derek J. Jardieu
*Attorney, Agent, or Firm*—Christensen O'Connor Johnson & Kindness PLLC

[57] ABSTRACT

An AC-DC converter for connecting an AC supply and a DC has a rectifier, and a harmonic correction circuit formed of (a) thyristor inverter legs connected at a common output point to form a Y switch, or separately at positive and negative terminals and (b) a voltage selection circuit for selecting a voltage derived from one of the positive and negative DC rails, or the AC lines, to control current shape and turn-off the thyristors. The thyristors are turned on by, and may also be turned off by, a controller. The voltage selection network may be a resonant circuit that uses ramping of the voltage at the outputs from the thyristors to turn the thyristors off or switches controlled by the controller. A converter for converting DC to AC power has an inverter bridge, a DC input line inductor on each DC rail, a generator for generating a waveshape output that has a frequency equal to the number of AC lines times the frequency of the AC supply; and a multiplexer for multiplexing the output of the generator onto the AC lines to reduce total harmonic distortion of current in the AC lines. The DC to AC converter may use the thyristor networks used for the AC to DC converter for the multiplexing function, under control of the controller. The generator may be a voltage selection network or switch network that selects a voltage source from one of the positive DC rail, the negative DC rail and a center tap on the DC rail.

20 Claims, 15 Drawing Sheets

OTHER PUBLICATIONS

SCR harmonic correction topologies for VSI drives, Dr. John C. Salmon, Emanuel Bocancea, Rajat Bhargava, Dr. Edwin Nowicki, IEEE Canadian Conference on Electrical & Computing Engineering, May 26–29, 1996.

A single–switch 1–phase flyback rectifier operated with a non–isolated dual dc–rail output and a unity input displacement factor, John C. Salmon, U or A, Conference, Sep. 25–28, 1994, Montreal, 4 pages.

Comparative evaluation of circuit topologies for 1–phase and 3–phase boost rectifiers operated with a low current distortion, John C. Salmon, U of A, Conference dated Sep. 25–28, 1994, Montreal, 4 pages.

3–phase pwm boost rectifier circuit topologies using 2–level and 3–level asymmetrical half–bridges, Dr. John C. Salmon, conference date: Mar. 5–9, 1995, 7 pages.

Performance of a 1–phase buck–boost rectifier using two coupled windings and a split dc–rail output voltage, Dr. John C. Salmon, e date: Mar. 5–9, 1995, 7 pages.

Circuit topologies for pwm boost rectifiers operated from 1–phase and 3–phase ac supplies and using either single or split dc rail voltage outputs, Dr. John C. Salmon, Confrerence date: Mar. 5–9, 1995, 7 pages.

Operation, control and performance of a family of high power unity power factor rectifiers, Dr. John C. Salmon, Thomas Tang, Dr. Edwin Nowicki, Conference date: Sep. 5–8, 1995, 4 pages.

A 3–phase boost converter for lowering the input current distortion of a VSI drive using mutually coupled dc–link inductors, Dr. John C. Salmon, Dr. Edwin Nowicki, conference date: Sep. 5–8, 1995, 4 pages.

A 3–phase buck–boost, converter for lowering the input current distortion of a voltage source inverter drive, Dr. John C. Salmon, Stuart Olsen, Dr. Edwin Nowicki, conference date, Oct. 1995: IEEE 1995, pp. 2475–2482.

SPICE3 simulation techniques in power electronics, Dr. John C. Salmon, Dr. Edwin Nowicki, 1996 IEEE, Conference date: May, 1996, pp. 651–654.

Chapter 22, Thyristors, from Power Electronics, converters, applications and design, by Mohan, Undelond and Robbins, Ed.1, John Wiley & Sons, ISSNO–471–61342–8, pp. 568–591.

Chapter 1, Power Semiconductor Devices from Power Electronics & acdrives, B.K. Bose, Edition 1, Prentice Hall, ISBN 0–13–686882–7, pp. 1–13.

PRIOR ART

PRIOR ART

PRIOR ART

PRIOR ART

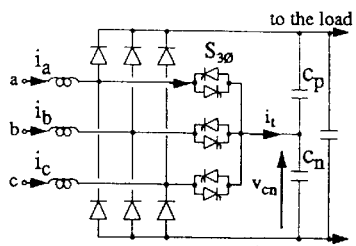
FIGURE 13A
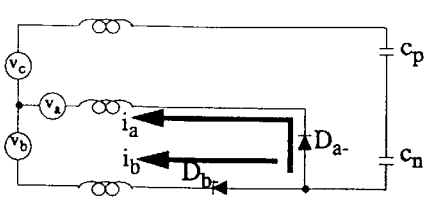
FIGURE 13B
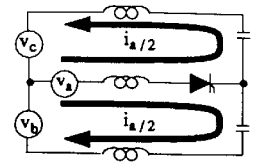
FIGURE 13C
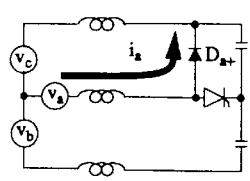
FIGURE 13D
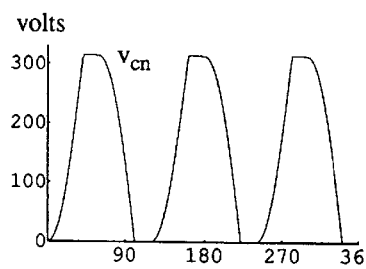
FIGURE 13E
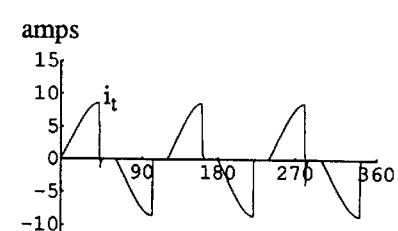
FIGURE 13F
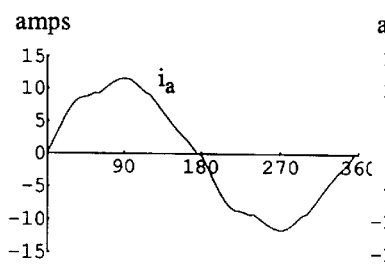
FIGURE 13G
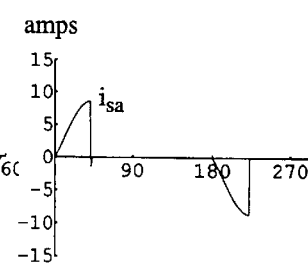
FIGURE 13H
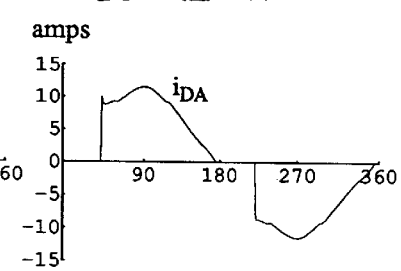
FIGURE 13I
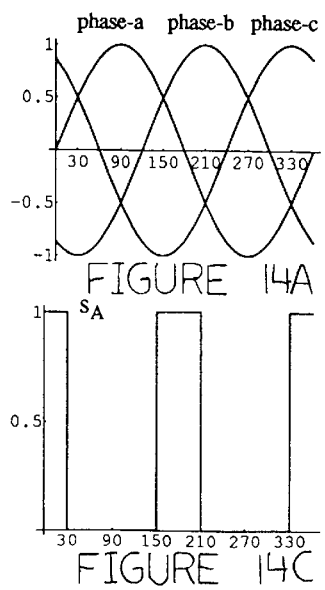
FIGURE 14A
FIGURE 14C
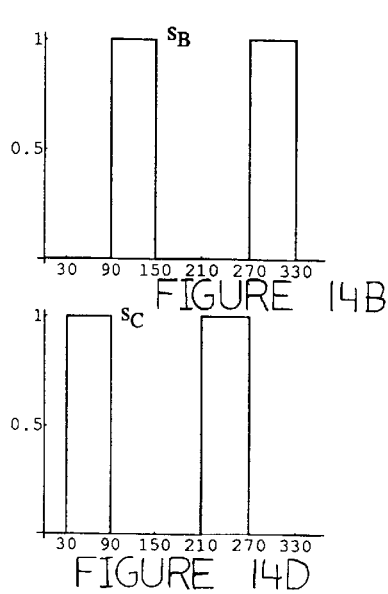
FIGURE 14B
FIGURE 14D

HARMONIC CORRECTION OF 3-PHASE RECTIFIERS AND CONVERTERS

FIELD OF THE INVENTION

This invention relates to improvements in circuits used for power conversion from AC to DC and from DC to AC.

BACKGROUND OF THE INVENTION 3-phase rectifiers used frequently in ac motor drive, such as thyristor rectifiers and diode rectifiers, can pollute the ac-supply with significant levels of low-frequency harmonics and excessive VARs. With a large growing market, tougher regulations and severe economic restraints, the design of unity fundamental power factor (ufpf) 3-phase rectifiers operating with a low current total harmonic distortion (low thd) is of significant interest to many drive manufacturers and designers of power electronic equipment receiving power from 3-phase sources.

FIGS. 1A–1F, 2A–2D, 3A–3C and 4A–4D represent the prior art. The main applications for the invention are industrial variable speed drives, as shown in FIG. 1A, and any power electronic interface to a 3-phase sinusoidal supply such as the ac utility mains supply and 3-phase generators. The standard widely used low cost 3-phase diode rectifiers are shown in FIGS. 1B, 1C and 1D. The diode rectifier with a C dc filter, FIG. 1B, draws currents from the ac supply, FIG. 2A, which are rich in harmonics. The IEEE 519 standard, and IEC 555, and problems associated with high harmonics in the utility, restrict, the use of this circuit to low power. The ac supply currents associated with the rectifiers in FIGS. 1C and 1D are shown in FIGS. 2B and 2C respectively. These currents are lower in harmonics but are still not close to the 5% distortion level specified in the standards. A pulse width modulated (PWM) IGBT (Insulated Gate Bipolar Transistors) inverter bridge with a constant voltage dc rail, see FIG. 1E, and PWM GTO (Gate Turn Off Thyristor) with a constant current dc rail, see FIG. 1F, are widely used rectifiers presently being used in industry when lower line current harmonics, and regulation of the dc rail voltage or current, are required. Variations to these rectifiers, such as 12-pulse rectifiers and 3-level inverter bridges, are variations used in high power and high voltage applications. All these rectifier types produce line currents with low harmonics, as illustrated in FIG. 2D, but suffer from high electrical stresses, high per unit current ratings, filtering problems, emi/rfi emissions, high switching losses, and lower reliability.

Many circuit topologies exist that produce high performance and low line current harmonics, but with semiconductor switches that have lower electrical stresses, lower per-unit current ratings, and survivability under certain failure conditions. The rectifiers in FIGS. 3A–C are examples of circuit topologies for phase-3 pwm boost rectifiers that operate with a unity fundamental power factor and low distortion ac line current [Salmon, J. C.: "Reliable 3-phase pwm boost rectifiers employing a stacked dual boost converter sub-topology", IEEE Trans. on Ind. Appl. VOL. 32, NO. 3, May/June 1996, pp. 542–551]. Overlap delays between the switching of the upper and lower devices in the pwm rectifier leg are not critical and diodes eliminate the possibility of the dc-link capacitor discharging into short circuits and shoot-through fault conditions. The rectifiers are controlled using a "stacked dual boost converter cell" sub-topology model that can be used in two current control modes. The dual current control mode shapes two line currents and can achieve current distortion levels below 5%. The single current control mode shapes one line current and can achieve current distortion levels close to 5% with the rectifier output dc voltage at the standard level associated with a rectified mains voltage. The per-unit current ratings for the switches in the 3-phase pwm switch networks are around 15–20% of the input rms line current as compared to 71% for a standard 3-phase pwm rectifier.

The standard pwm rectifier, see FIG. 1E, has the advantage of using a standard 3-phase module with a bi-directional power flow capability. This rectifier has disadvantages in terms of having a high cost, high per-unit current rating, poor immunity to shoot-through faults and high switching losses. The pwm rectifier using a boost diode, as shown in FIG. 3A, uses a standard 3-phase pwm module, hereby referred to as a pwm rectifier. The dc-rail diode provides shoot-through protection and allows the pwm rectifier to be operated using a stacked dual boost converter sub-topology model. The pwm rectifier using a 3-phase diode bridge, as shown in FIG. 3B, uses a pwm rectifier module with very low current ratings and hence has a low cost potential and a high reliability potential. All the rectifiers in FIGS. 3A–3C use a 3-phase switching network with low current ratings and can operate as a diode rectifier if the 3-phase switch module fails. The delta-connected and Y-connected bi-directional switch rectifiers, see FIG. 3C and FIGS. 4A–4D, have very low conduction losses and switching losses especially if true bi-directional switches become commercially available [Salmon June 1996, above referred to and Salmon, J. C.: "Reliable 3-phase pwm boost rectifiers employing a stacked dual boost converter sub-topology", IEEE Trans. on Power Electr., VOL. 11, NO. 4, July 1996, pp. 592–603].

FIGS. 4A–D illustrate rectifiers using Y-connected 3-phase switches with ac-line inductors. The switches $S_a$, $S_b$ and $S_c$ are bi-directional switches and are shown in a simplified from in the figures for illustrative purposes. These switches and operation, as described in the literature [Salmon, July 1996], would be implemented using MOSFET, IGBT and GTO type switches.

A significant disadvantage of the prior art rectifiers presented in FIGS. 3A–3C and 4A–4D are their relatively convoluted and non-standard topologies, compared with a standard 3-phase rectifier, high switch count and high conduction losses. The prior art circuits would commonly be implemented using IGBT switches. The circuit switches have a relatively high peak current to rms ratio since an IGBT device is often selected based upon the peak current flowing through the device rather than the rms current, and since an IGBT switch has a relatively low peak current to rms ratio, IGBT switches are not well suited for use in these circuits.

SUMMARY OF THE INVENTION

The invention described in this patent uses novel circuit topologies using thyristor switches to achieve the current wave shaping objects of the circuit topologies shown in FIGS. 3B and 4C. The prior art topologies given in FIGS. 3A–3C and 4A–4D would not be able to turn off the thyristors, a problem commonly associated with thyristor networks, and thyristor equivalent circuits cannot be implemented directly in these prior art technologies. The invention describes how an auxiliary network is used to turn off the thyristors. The resultant thyristor-based harmonic corrections networks lower the total cost of the power electronic switches and enable the harmonic injection technique to be used at higher power levels. The invention has new a feature of allowing power reversal in the rectifier under conditions of lower power, e.g. 0.2 p.u. The invention also introduces a new implementation where harmonic correction of converter circuits can be achieved when a converter is passing power into the ac supply.

Disadvantages in the prior art are therefore addressed in the invention by using low cost thyristor switches. Since thyristors naturally have a high peak current to rms ratio, semiconductor switches can be chosen with lower rms ratings. Since the harmonic correction techniques being used exposes the switches to a high peak current to rms ratio, the nature of the harmonic correction technique favour the use of thyristors, rather than IGBTs, and very low cost harmonic correction circuits can be obtained using the thyristors.

According to one aspect of the invention, an AC to DC converter for connecting an AC power supply and a DC voltage rail has a rectifier bridge, and a harmonic correction circuit formed of thyristors. The harmonic correction circuit is formed of a thyristor inverter leg for each power line whose outputs are connected at a common point to form a Y switch, or whose outputs are separately connected to form positive and negative output terminals. Also, in the harmonic correction circuit is a voltage selection circuit that uses a voltage source derived from the positive and negative DC voltage rails, or the AC power lines, to control current shape and turn off the thyristors. The thyristors are turned on by, and may also be turned off by, a controller. Various voltage selection networks may be used, and in one aspect of the invention there is proposed a resonant circuit that uses ramping of the voltage at the outputs from the thyristors to turn the thyristors off. In addition, according to a further aspect of the invention, the voltage selection network is formed of switches controlled by the controller.

In a further aspect of the invention, a converter for converting DC power on a DC voltage rail to AC power has an inverter bridged between the AC power supply and the DC voltage rail, a DC input line inductor on each DC voltage rail, a generator for generating a current waveshape at an output of the generator that has a frequency equal to the number of AC power lines times the frequency of the AC power supply; and a multiplexer for multiplexing the output of the generator onto the AC power lines to reduce total harmonic distortion of current in the AC power lines. The DC to AC converter may use the thyristor networks used for the AC to DC converter for the multiplexing function, under control of the controller. The generator may be a voltage selection network or switch network that selects a voltage source from one of the positive DC voltage rail, the negative DC voltage rail and a center tap on the DC voltage rail.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and into with the intention of limiting the scope of the invention, in which like numerals denote like elements and in which:

FIGS. 13A, 13B, 13C and 13D are schematics illustrating current flow in a 3-phase AC to DC rectifier with harmonic correction circuits according to the invention;

FIG. 13E is a graph showing how the voltage at the capacitor $C_n$ resonates during operation of a voltage selection network shown in FIG. 13A;

FIG. 13F is a graph showing how the current $i_t$ at the center tap resonates with the AC voltage supply;

FIG. 13G is a graph showing the result of the use of the embodiment of the invention shown in FIG. 13A in which harmonic correction of the line a current is obtained;

FIG. 13H is a graph that shows the thyristor currents during operation of the invention;

FIG. 13I is a graph that shows the diode currents during the operation of the invention, which by comparison with FIG. 13H shows that the majority of the current flows through the diode rectifier bridge;

FIG. 14A shows signals representing the line A, B and C phase voltages over a complete cycle;

FIGS. 14B, 14C and 14D show the on time enable signals for the thyristor switches 3A, 3B and 3C curing a complete cycle;

DETAILED DESCRIPTION OF PREFERRED EMBODIMENTS

Figure 5A:
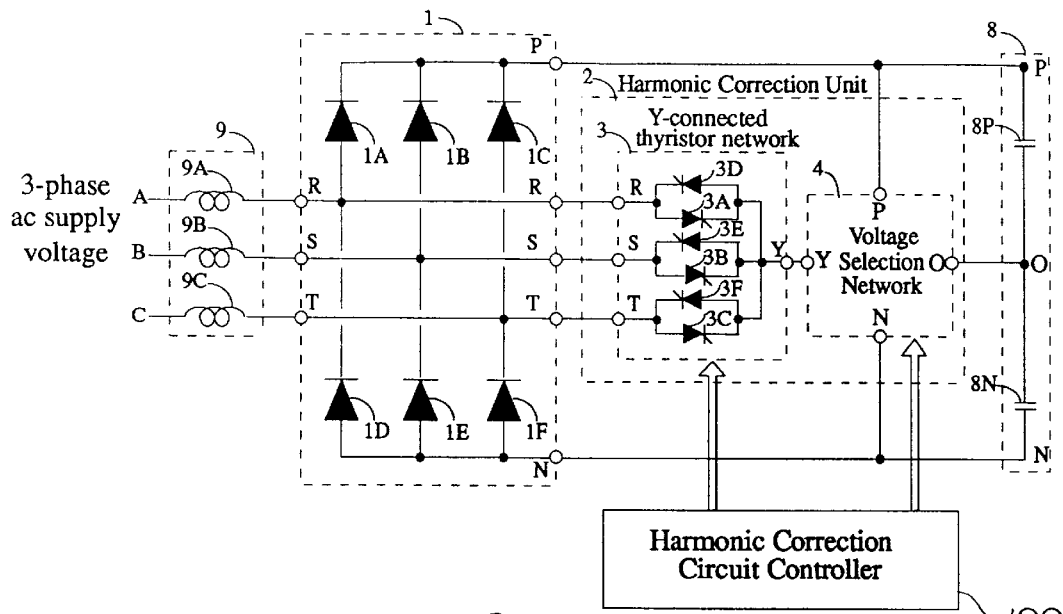
FIG. 5A is a schematic of a first embodiment of an AC to DC rectifier with harmonic correction circuit according to the invention.
Figure 5B:
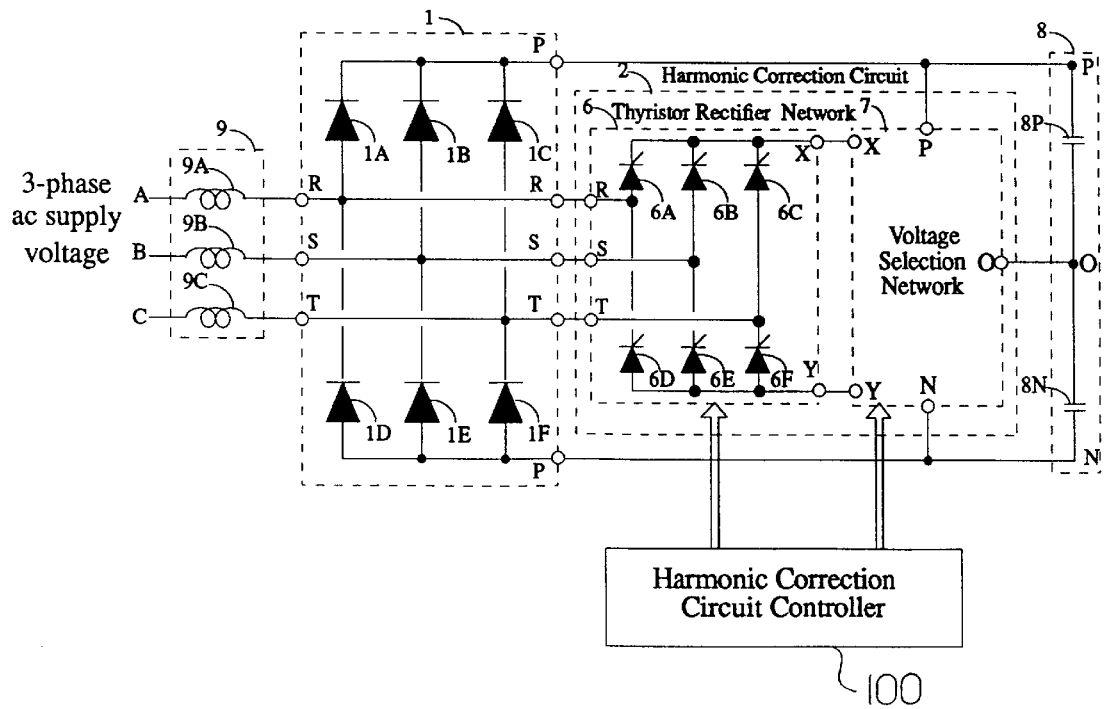
FIG. 5B is a schematic of a second embodiment of an AC to DC rectifier with harmonic correction circuit according to the invention.

FIGS. 5A and 5B show rectifiers that convert AC power, more specifically an AC supply voltage, to DC power. Current is drawn from the AC supply and passed to a DC supply output voltage which results in a DC voltage rail including a positive rail P and negative rail N. A center tap on the voltage rail is defined as O. Normally there is a load connected to the output voltage. The thyristors used in the invention are scr thyristors, which are in themselves commonly commercially available.

FIGS. 5A and 5B show two embodiments of a three phase rectifier converting AC voltage to DC voltage. In principle, the invention can work with n-phase voltage supply where n>2, but typically three phase voltage supply is used, and the invention will be described with respect to that voltage. The three phrase rectifiers in FIGS. 5A and 5B consist essentially of two parts, namely a three phase diode rectifier 1 bridged between the AC power supply formed of lines A, B and C and the DC voltage rail PN and a harmonic correction unit 2 connected at points R, S and T on the three phrase AC power supply lines A, B and C respectively. Input line inductors 9A, 9B and 9C are provided on each AC power line A, B and C respectively in series between the AC power supply and the diode rectifier 1. The three phase diode rectifier 1 has, for each line A, B and C respectively, diode pairs 1A and 1D, 1B and 1E, and 1C and 1F, connected in series with a common point connected to the AC line voltage and the outputs of the diodes connected to the positive and negative rails respectively of the DC voltage rail PN. The diode rectifier 1 forms a standard power electronic circuit known as three phase diode rectifier.

In the operation of the invention, the three phase diode rectifier draws the largest amount of power from the three phase AC supply. The smaller part of the circuit that draws a small amount of power is called the harmonic correction unit 2 and it is the harmonic correction unit 2 in combination with the rectifier (or converter as described in relation to FIGS. 6A and 6B) which forms an important aspect of the invention. The harmonic correction unit 2 in all cases draws current or injects current into the three phase supply in order to correct for the current harmonics that are drawn by the main diode rectifier. The diode rectifier by itself has a poor performance in terms of high harmonics in the currents, but with the harmonic correction unit these harmonics are lowered and the end result is that currents are drawn from the three phase AC supply that are sinusoidal with reduced harmonics.

The main benefit of the harmonic correction unit supplied in this invention is that the switches and components within the unit have a very low current rating and have very low electrical stress. This gives these units a benefit relative to other approaches because as a result of the lower stresses the components are small and low cost.

The harmonic correction unit has two portions to it as illustrated in FIG. 5A. The first portion is a Y connected thyristor network 3. This network 3 consists of three sets of two thyristors (3A and 3D; 3B and 3E, and 3C and 3F) connected in anti-parallel. Each pair of anti-parallel connected thyristors has two terminals. The first terminal is connected to one of the AC supply voltages at a corresponding one of the points R, S or T and the second terminal is connected to a common point or terminal Y between the three pairs of anti-parallel thyristors.

In order for the Y connected thyristor network 3 to operate, it requires a voltage selection network 4. The voltage selection network 4 is a set of circuits that has various implementations as described in FIGS. 8A–8D and FIGS. 10A–10D inclusively. The function of the Y connected thyristor network circuit 3 is to select one of the line voltages R, S and T according to a time sequence that is correlated with the output of the diode rectifier 1.

The voltage selection network 4 also decides how this selected line voltage is linked to the DC rail voltage or another voltage source at the output, at points P, O or N, or at another tap position between P and N (that is, a tap voltage whose value is between P and N). Alternatively, the voltage selection network 4 may link each AC supply line to one of the other voltage supply lines in the case of the R-switch shown in FIG. 5B. One function of this voltage selection network is to pass voltage to one of the three line voltages R, S and T via the Y connected thyristor network 3. Another function is to turn off the thyristor switches in the Y connected thyristor network 3. Without this second function it would be difficult if not impossible to use the thyristor network. The harmonic correction unit 2 in each figure determines the voltages at the nodes RST and helps to wave shape the current being drawn from the three line inductors 9A–C. The thyristor switches 3, 6 and the voltage selection networks 4, 7 form links between the AC power supply lines A, B and C, and a voltage source, P, O, N or, in the case of the use of the rectifier switch of FIG. 5B, the AC power supply lines themselves.

Two embodiments of the thyristor networks are shown in FIGS. 5A and 5B. FIG. 5A shows a Y connected thyristor network consisting of two anti-parallel diodes in each leg and the other thyristor rectifier network 6 shown in FIG. 5B is a three phase thyristor rectifier network, whose topology is a standard topology used widely in variable speed drives. The rectifier connected network 6 consists of three sets of rectifier legs. Each leg consists of two thyristors (6A and 6D, 6B and 6E, 6C and 6F) connected in series with a common point connected to one of the three phase line voltages A, B and C via the on-line inductors 9A, 9B and 9C. The output of each leg consists of positive X terminals connected together and negative Y terminals connected together. This thyristor rectifier network 6 is then connected to the voltage selection network 7.

The voltage selection network 7 has two functions. The first function is to connect the positive and negative terminals X and Y of the rectifier network 6 to one of the voltages associated with the output DC rail voltage and also it can select and short circuit between the positive and negative rails X and Y of the rectifier network 6.

The second function of this voltage selection network 7 is to turn off the thyristors 6A–6F in the rectifier network 6. The combined action of the rectifying network 6. The combined action of the rectifying network 6 and the voltage selection network 7 of FIG. 5B is similar to the action of the thyristor network 3 and voltage selection network 4 of FIG. 5A namely to pass a voltage to one of the rectifying input terminals R, S and T and wave shape the current being drawn from the AC voltage.

The action of the Y-connected thyristor network 3 and the thyristor rectifier network 6 are very similar with the exception that the thyristor rectifier network 6 can also have additional features produced as a result of it having two terminals X and Y. The result of this allows the thyristor rectifier network 6 also to inject power into the AC line, and thus there may be a bidirectional power flow through this bridge. It can be of benefit in many applications where with a variable speed drive you wish to regenerate power from the three phase motor load.

Figure 6A:
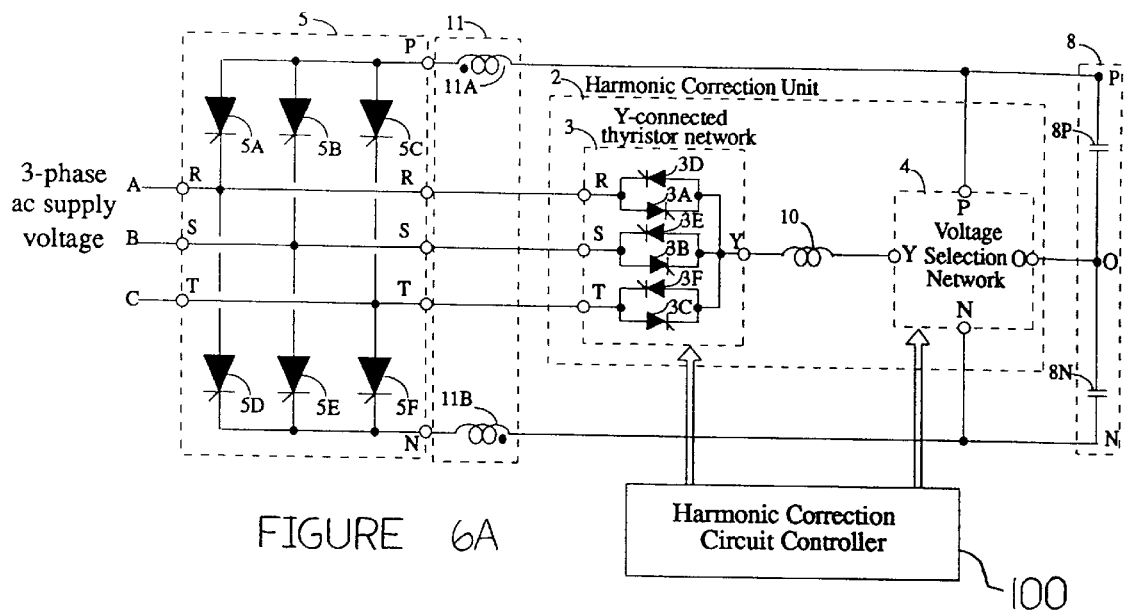
FIG. 6A is a schematic of a first embodiment of an AC to DC rectifier with harmonic correction circuit according to the invention.
Figure 6B:
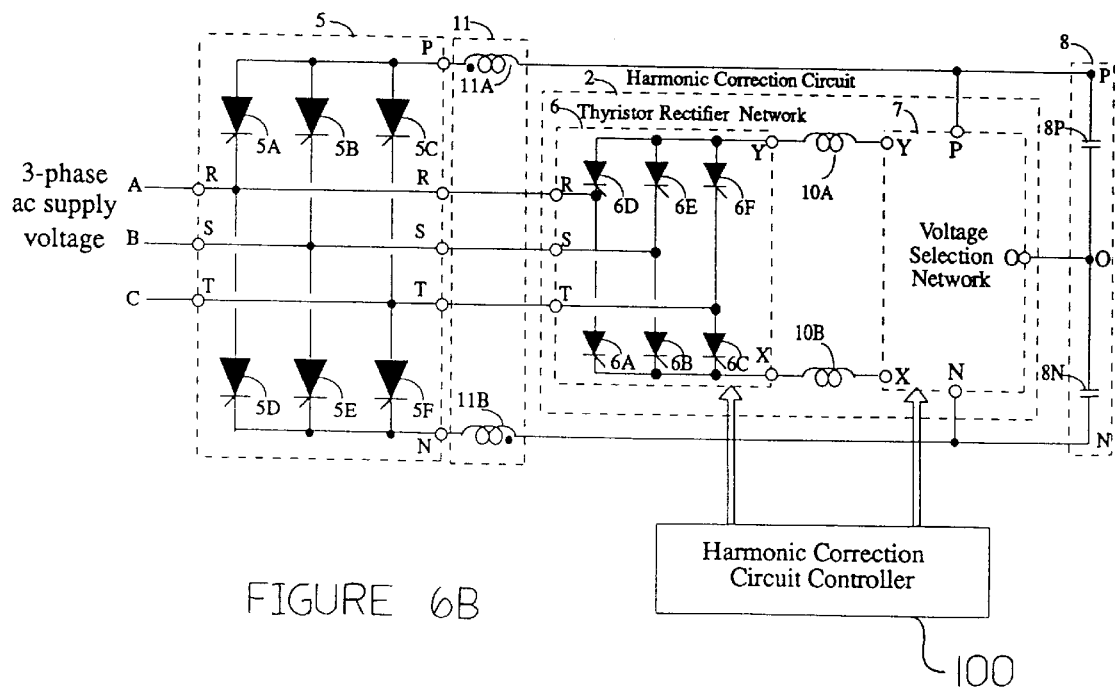
FIG. 6B is a schematic of a second embodiment of an AC to DC rectifier with harmonic correction circuit according to the invention.

Referring now to FIGS. 6A and 6B, an embodiment of the invention for conversion of DC power to AC power is shown. The main portion of the converter network consists of a converter bridge 5. This converter bridge consists of three legs, formed of series connected pairs of thyristors 5A and 5D, 5B and 5E, 5C and 5F with a common point between each pair of thyristors. The common point is connected to one of the AC line voltages R, S and T. Each leg has an output consisting of a positive and negative rail with the anode end of each thyristor pair being connected to the positive rail P and the cathode end of each thyristor pair connected to the negative rail N. Power is passed to the positive and negative rails P and N of the converter 5 from the plus and minus terminals P and N respectively of the DC rail via inductor 11A on the positive rail P and inductor 11B on the negative rail N. These two inductors are often mutually coupled magnetically but do not have to be so. The function of these inductors 11A and 11B is to provide a filtering of the current and to pass a current to the output converter 5 with a low ripple. The converters 5 cannot be normally operated without these inductors 11A and 11B. The function of the converter 5 is to pass the DC line current to the line voltages on lines A, B and C in a transmultiplex manner the function of which is widely known. The end result is that currents pass into the AC supply with a high harmonic distortion if no harmonic correction is applied. Hence the function of the harmonic correction unit 2 in FIG. 6A is to pass current to the AC line with low harmonic distortion. The harmonic correction unit 2 consists of a thyristor network 3,6 and a voltage selection network 4, 7. The voltage selection network in combination with the inductors 10 or 10A and 10B waveshapes the current and generates a current waveshape, preferably a triangular wave, at its output that has a frequency equal to the number of AC power lines times the frequency of the AC power supply.

The thyristor network 3, 6 has two implementations. Networks 3 is a Y connected thyristor network referred to as a Y switch and the network 6 is a thyristor rectifier network which is referred to as an R switch. The function of the voltage selection network 4, 7 in both implementations is to control the output voltage of the network so as to waveshape the current flowing through inductor 10 in FIG. 6A, and inductors 10A and 10B in FIG. 6B. The action in both cases is the same. In the second case current through both inductors is controlled and the wave shape of the combined current is the same as the wave shape through the single inductor in the first case, namely a triangular current with a frequency three times the frequency of the AC supply. This current is time multiplexed by the thyristor networks 3, 6 in a switched manner so that current is passed to one of the input line terminals R, S and T one at a time. Thus, the function of the thyristor networks 3, 6 is to press this triangle wave current into one of the line terminals R, S and T and the additional feature of the networks 3 and 6 in FIGS. 6A and 6B that is different to the networks shown in FIG. 5A and 5B is that the thyristors are turned off by the AC supply voltage. This is often called natural commutation. In FIGS. 5A and 5B, the thyristors had to be turned off by the voltage selection network.

Figure 7:
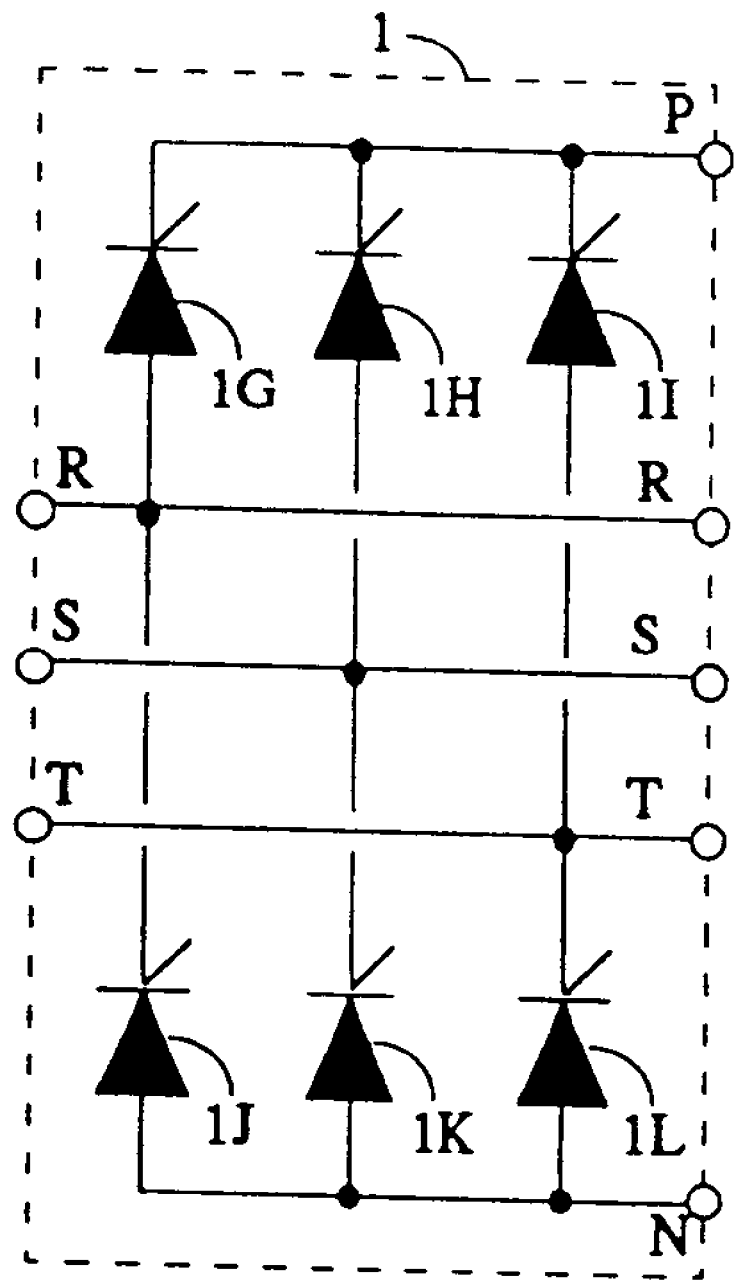
FIG. 7 is a schematic showing an alternative embodiment of a 3-phase rectifier for use in the embodiment of FIGS. 5A and 5B.

An alternative embodiment of a rectifier 1 is shown in FIG. 7 which shows a three phase thyristor converter with three pairs of series connected thyristors 1G and 1J, 1H and 1K, 1I and 1L whose common points are connected to the AC supply terminals R, S and T respectively. In the series of FIGS. 8A–11E, element 3 is the Y connected thyristor network (Y-switch) of FIGS. 5A and 6A, and element 6 is the R switch of FIGS. 5B and 6B.

FIGS. 8A–8D illustrate three phase rectifiers where the voltage selection network 4 consists of resonance capacitors 23–25 used in conjunction with a thyristor Y switch 3, while FIGS. 9A–9D illustrate three phase rectifiers where the voltage selection network 4 consists of resonant capacitors 23–25 used in conjunction with a thyristor R switch 6. Switches 31, 32, 28, 26, 27 in FIGS. 8A–9D allow the resonant action to be controlled more accurately and the result is to produce lower harmonic currents under low power levels in addition to a higher power level. FIGS. 10A–10D and 11A–11E illustrate implementation of the voltage selection networks 4 and 7 using IGBT switches and the function of these switches is to connect the output of the thyristor networks 3, 6 to the DC rail. The Y switch 3 has one common point Y and the R switch 6 has two terminals X and Y. Besides connecting the thyristor networks 6 to various points of the DC rail, the voltage selection networks 7 also can short the Y and X terminals and hence short two of the lines A, B, C together without necessarily having to connect to the DC rail PN.

As there are two terminals on the thyristor R switch 6, it is possible for the voltage selection network 7 to act in a different mode, and that is to pass power C. This represents a reversal of power flow, and may be usefully used where a variable speed drive generates power into the AC supply.

To permit control of flow of current through the thyristor switches 3, 6, the thyristors in the thyristor switches 3, 6 must be turned on and off. The on function is controlled by the harmonic correction circuit controller 100. The thyristor are enabled, but not necessarily turned on in accordance with the turn on scheme shown in Table 1 and as shown in FIGS. 14B–14D. The off function in the case of FIGS. 5A and 5B is controlled by the voltage selection network: when the thyristors are reverse biased they are turned off. In the case of the thyristors shown in FIGS. 6A and 6B, the thyristors are turned off by the voltage at terminals R, S and T and the thyristor firing sequence used in the bridge.

Figures 8A, 8B, 8C, 8D:
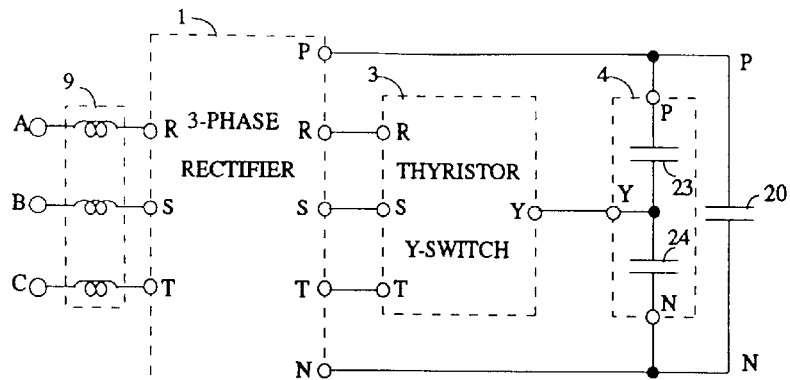
FIGS. 8A, B, C and D are schematics showing four different voltage selection networks for use with the embodiment of FIG. 5A in which the voltage selection network is resonant.

In FIG. 8A, capacitors 23 and 24 are connected in series between the positive and negative rails P and N, with the center point between them connected to the output terminal Y of the thyristor switch 3. After turn on of one of the thyristors in the network 3, the voltage at Y oscillates from one DC rail voltage to the other. This resonant action ends with the effect of reverse biasing the thyristor and turning it off. The value of the capacitors 23 and 24 is selected such that the inductors 9A, 9B and 9C form a resonant circuit with the capacitors 23 and 24.

In FIG. 6B, capacitor 25 is connected to the center point between capacitors 21 and 22 connected between the DC rails P and N and to the output terminal Y of the thyristor switch 3. After turn on of one of the thyristors in the network 3, the voltage at Y oscillates from one DC rail voltage to the other. This resonant action ends with the effect of reverse biasing the thyristor and turning it off. The value of the capacitors 23, 24 and 25 are selected such that the inductors 9A, 9B and 9C form a resonant circuit with the capacitors. The capacitors 23–25 also wave shape the current drawn from the AC supply. Capacitors 20, 21 and 22 between rails P and N are conventional electrolytic capacitors. In FIG. 8A shows an implementation where a standard single DC rail output voltage is used, so this is very common in low voltage situations (typically in the order of 220 volts). In higher voltage cases, typically in the order of 460 volts, a dual DC rail output is used as in FIG. 8B.

FIGS. 8C and 8D show the circuits of FIGS. 8A and 8B implemented with bi-directional switches 31 and 32 in series between the resonant capacitors and the switch 3. The bi-directional switches 31, 32 add extra control over turn-on and turn-off and that can be used to fine tune the harmonics or lower the harmonics where the power of the rectifier is fluctuating. Switches 31, 32, are also controlled by the harmonic correction circuit controller 100.

FIGS. 9A–9D show circuits using R-switch 6 with resonant capacitors 23–25 as described in FIGS. 8A–8D. The choice of a resonant voltage selection network 7 can be dependant upon costs and packaging. The circuits of FIGS. 9A–9D are to reduce costs in the R-switch 6 implementation.

Figure 9A:
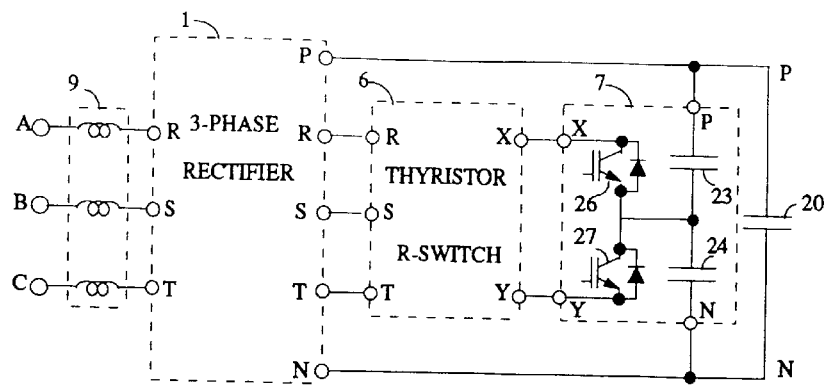
FIGS. 9A, B, C and D are schematics showing four different voltage selection networks for use with the embodiment of FIG. 5B in which the voltage selection network is resonant.
Figure 9B:
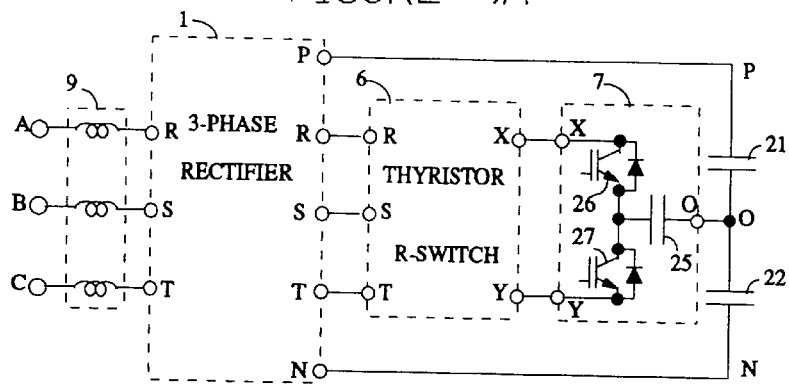
Figure 9C:
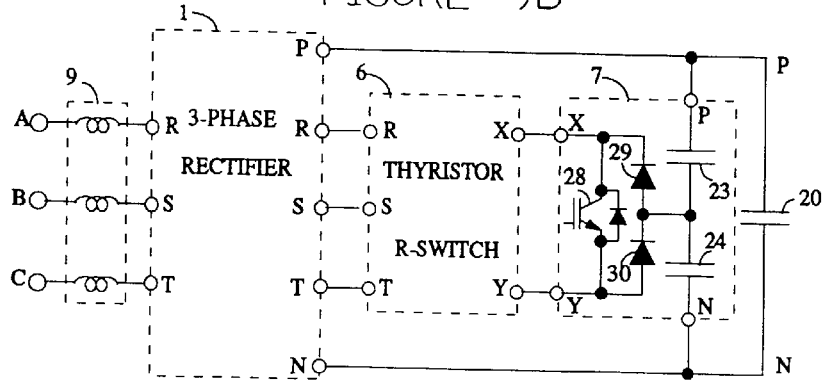
Figure 9D:
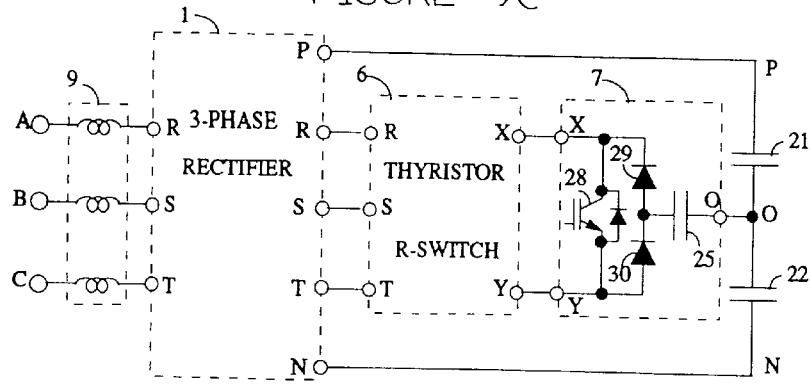

FIG. 9A is for single DC rail output as in FIG. 8A. In this instance, IGBT switches 26 and 27 are located between the center point of the capacitors 23, 24 and the X and Y terminals respectively of the R switch 6. FIG. 9B is for a dual DC rail output, as in FIG. 8B with the switches 26, 27 between the points X and O and the points Y and O respectively. FIGS. 9C and 9D show situations with a single and dual DC rail outputs using one switch 28. The one switch versions of FIGS. 9C and 9D are often regarded as low cost, but the two switch versions can lower losses in the power electronics, and possibly (though of lesser importance) lower heating design. The embodiments of FIGS. 9C and 9D could be considered the lower cost and most preferred implementation.

FIGS. 10A–11E show Y-switch and R-switch versions of harmonic correction networks 2 where the voltage selection networks 4, 7 are implemented using standard switches and diodes 31–45, 50–56 and 60–65. The switches shown in the figures are IGBTs, but other switches such as GTO or MOSFETS could be used. Use of these switches allows gate control signals from the harmonic correction circuit controller 100 to be used to control current through terminals X and Y.

The R-switch network 6 is possibly the most beneficial from a packaging point of view, and the R-switch network 6 also has embodiments where power flow can reversed. So the circuit shown in FIG. 11B has a power reversal function, and FIG. 11D has a power reversal function. The Y-connected thyristor switches do not have the power reversal function.

Figure 10A:
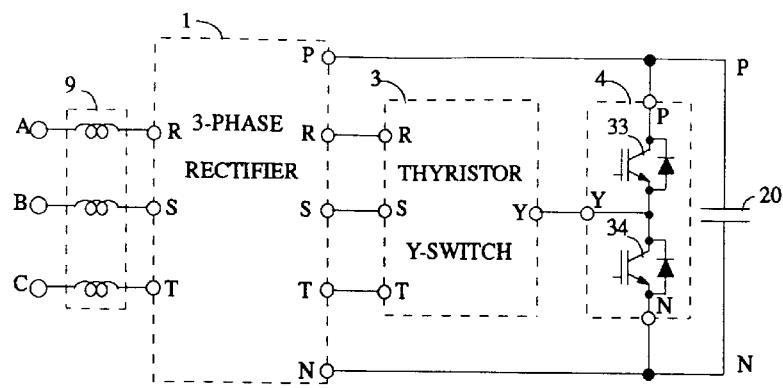
FIGS. 10A, B, C and D are schematics showing four different voltage selection networks for use with the embodiment of FIG. 5A in which a switching action of the voltage selection network turns off the thyristors in the thyristor switch.
Figure 10B:
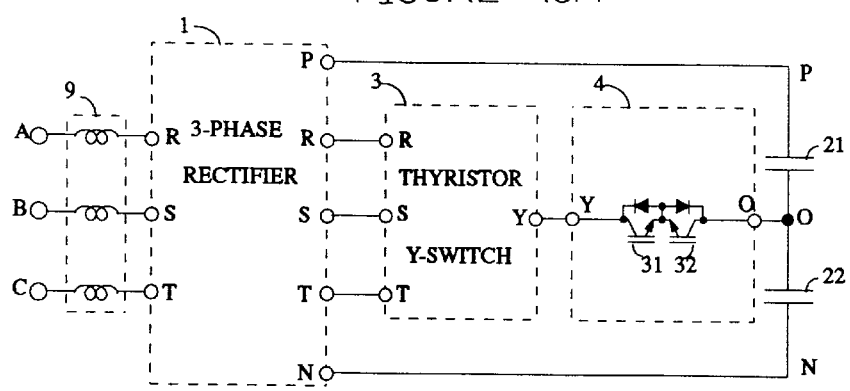

In FIG. 10A, using the thyristor Y-switch 3, the voltage selection network 4 consists of an inverter link formed of series connected IGBT switches 33 and 34 which connects the common point Y of the Y network 3 to either positive or negative rail P or N. This circuit is intended for low voltage situations where you have a single DC rail output. The circuit in FIG. 10B uses a bi-directional switch network, switches 31 and 32 back to back in series, connected between the centre tap O and the common terminal Y. The centre tap version may use two sets of capacitors, but this is considerably more expensive. The centre tap connection provides a better harmonic correction function of the line currents and can also result in a lower line inductance. The circuit is FIG. 10A, by the fact that it is connecting to a positive and negative rail, does not optimize the harmonic correction function and the inductors could be a little larger as a result. So the split DC rail in connection to the centre tap defined as node O normally gives better performance, but the DC rail being split is more expensive whereas a single DC rail is lower cost but doesn't give you as good a performance on the line wave shape and function.

Figure 10C:
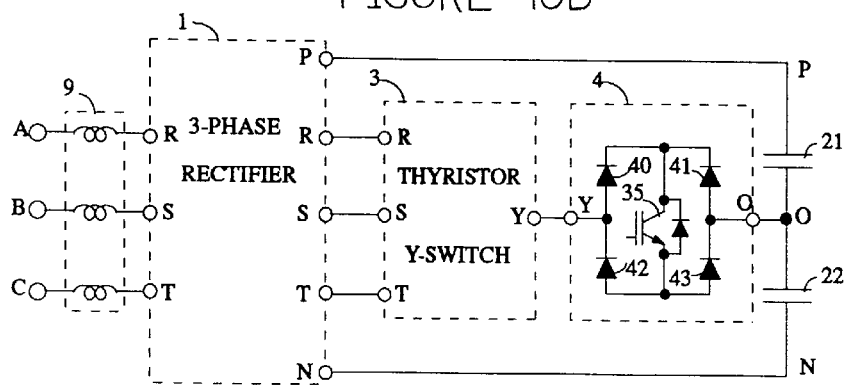

FIG. 10C shows a topology using a single switch, switch 35 and four diodes 40–43. This is considered to be lower cost, but the combination of this switch with four diodes is a little bit more complicated to implement and harder to use with high switching frequencies, so low cost is traded off against a more difficult packaging which can also increase the cost.

Figure 10D:
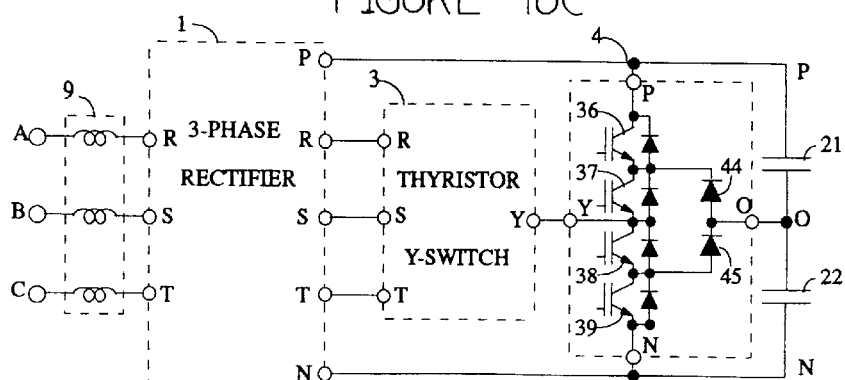

FIG. 10D shows a voltage selection network 4 using a configuration known in the art in itself, namely a three level inverter bridge composed of IGBTs 36–39 and diodes 44, 45. The three voltage levels that may be selected by the inventor bridge are at P, O and N. This network includes voltage selection capability and generally gives higher performance. In the case of higher voltage, the switches 36–39 are exposed to a lower voltage stress in this network, as compared to the inverter leg network in FIG. 10A. The switches in FIG. 10A are exposed to the DC rail voltage, whereas the switches in FIG. 10D are only exposed to half the DC rail voltage. So this network is more beneficial at higher voltage levels.

Figure 11A:
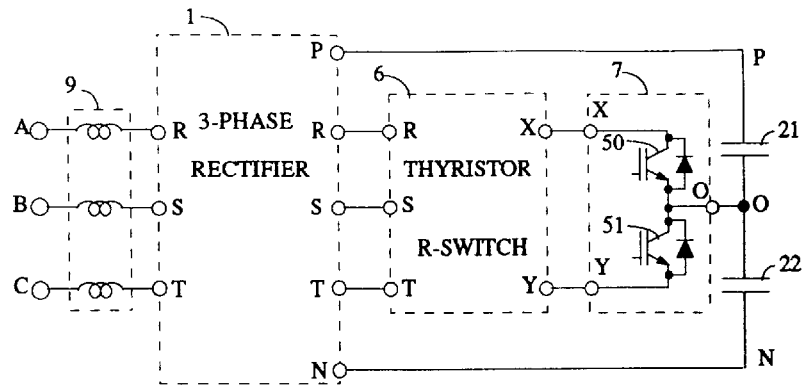
FIGS. 11A, B, C and D and E are schematics showing four different voltage selection networks for use with the embodiment of FIG. 5B in which a switching action of the voltage selection network turns off the thyristors in the thyristor switch.
Figure 11B:
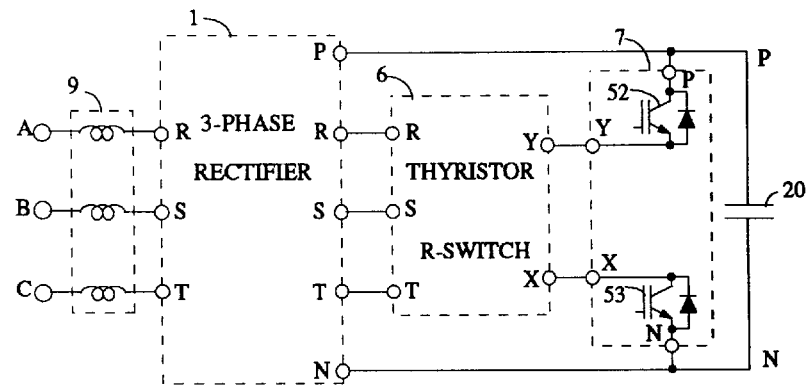

FIG. 11A shows a voltage selection network 7 with a standard inverter leg module composed of IGBT switches 50 and 51 connected to the tap O. This centre tap connection is generally regarded as giving better performance in the waveshape and function of the currents drawn into the rectifier 1. The inverter leg module 7 is considered to be a standard module, and hence, economic benefit. FIG. 11B shows a network of two switches 52, 53 that connect the R switch network 6 to either positive or negative rail of the DC outputs, and this is used where a single DC rail output voltage is used. However, the network also allows power reversal through the thyristor R switch and this can be useful for passing power into the AC supply at some small per unit level, such as 0.2 per unit or less. Thus FIG. 11B has two functions; harmonic correction in the normal rectifier mode, and a power reversal for intermittent use.

Figure 11C:
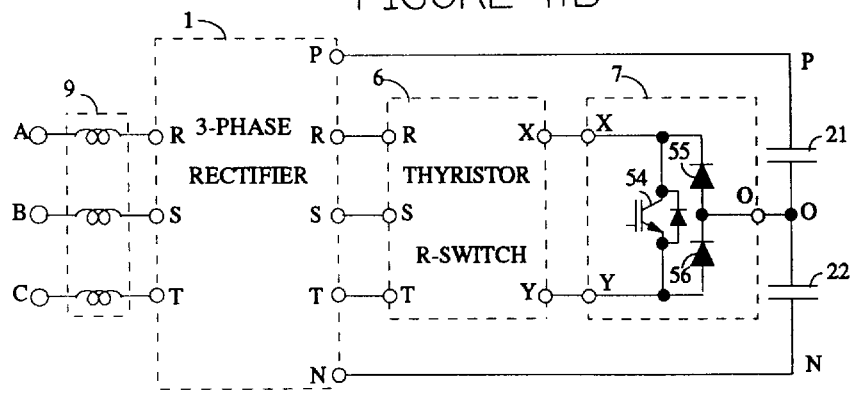

FIG. 11C shows a single switch 54 with diodes 55 and 56 connected between the X and Y terminals and the center tap O. This can represent low cost, but the combination of the two diodes 55, 56 and the IGBT 54 is a slightly more complicated packaging.

Figure 11D:
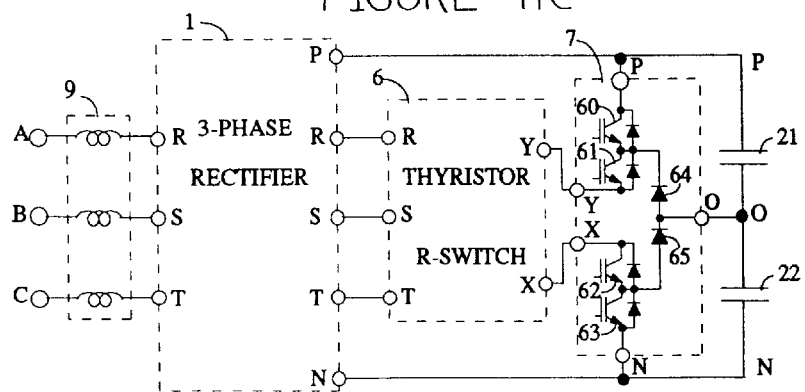

The circuit in FIG. 11D uses essentially a split three level inverter leg similar to the circuit in FIG. 10D. Switches 60 and 61 are connected in series between the Y terminal and the positive rail P or the center tap O, either of which may be selected, and switches 62 and 63 are connected in series between the X terminal and the negative rail N or the center tap O, either of which may be selected. This circuit gives voltage selection between the positive rail, the centre tap and the negative rail, and similar to the circuit in FIG. 11B, it provides the dual function mode of harmonic correction in the standard mode and power reversal on the occasion where this is required. This circuit is far more expensive, but can be considered useful under high voltage conditions where it is desired to reduce the voltage stresses on the IGBT switches.

Figure 11E:
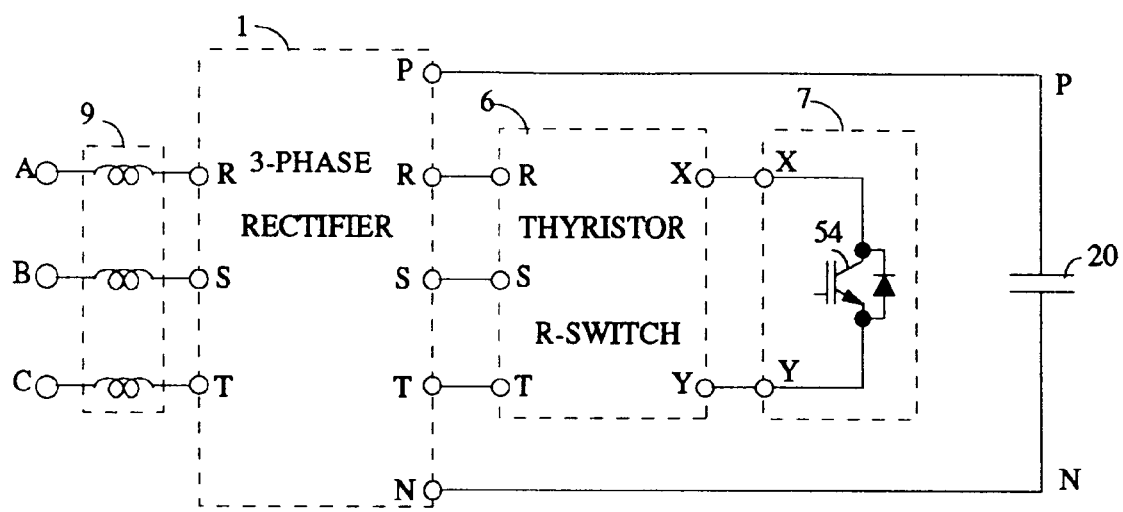

FIG. 11E shows a single switch 54 connected between the X and Y terminals of the R switch circuit 6. Switch 54 can be used to provide a short between the X and Y terminals and so short two of the rectifier terminals R, S and T when the appropriate thyristors are turned on. This circuit is very low cost implementation of the invention and as such is one of the preferred embodiments.

Figure 12A:
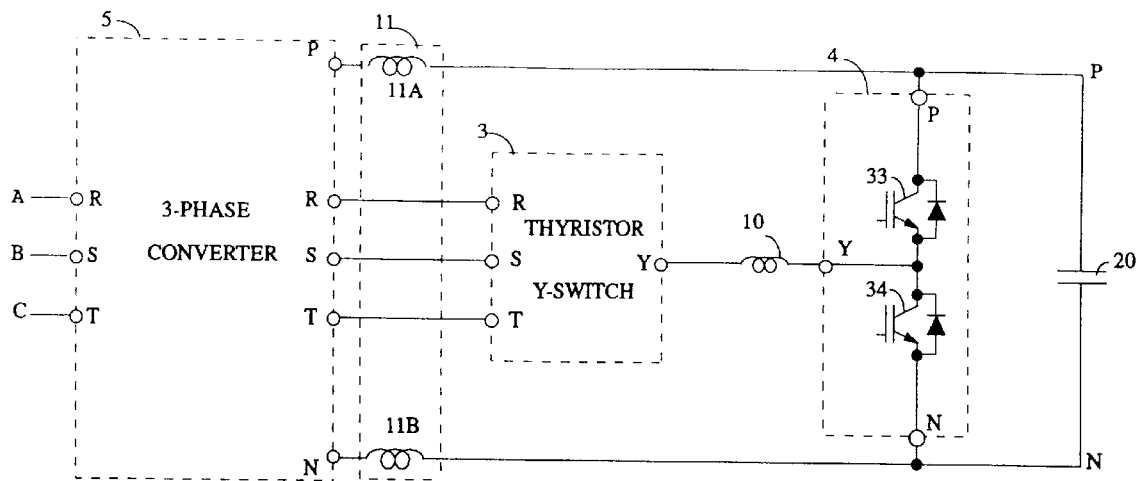
FIGS. 12A, 12B and 12C are schematics showing three embodiments of a DC to AC converter according to one aspect of the invention.
Figure 12B:
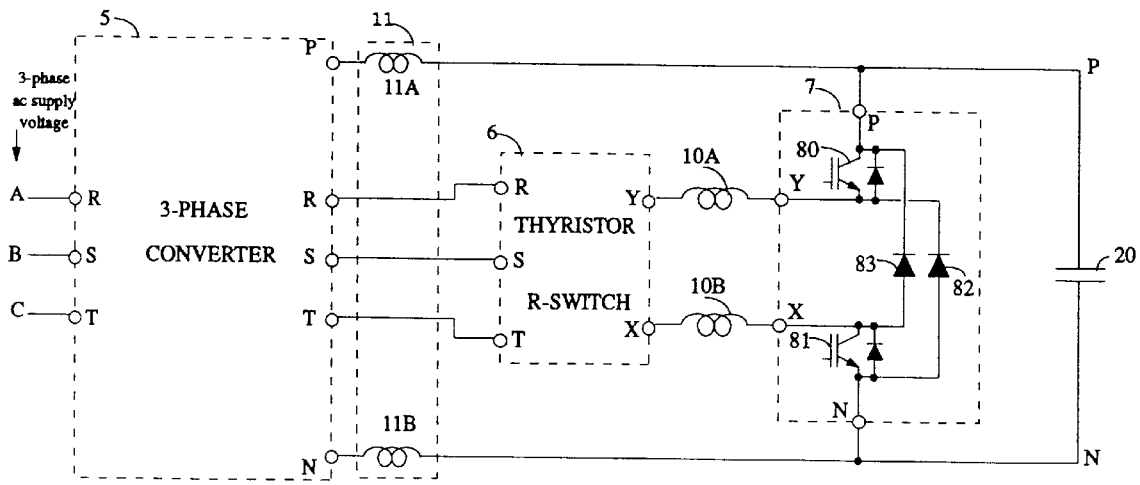

FIGS. 12A and 12B are each DC to AC converter topologies using a thyristor Y-switch 3 and a thyristor R switch 6 respectively. Both topologies can act in a similar manner with the exception that the R switch version has a potential for power reversal and this is shown in FIG. 12C.

The DC to AC converter of FIGS. 6A and 6B uses a thyristor bridge 5 and harmonic correction circuits 3 to correct harmonics of the currents drawn out of the converter so that the total line current that can pass into the AC supply is sinusoidal. As with the embodiment of FIGS. 5A and 5B, there are two classifications; first classification uses a Y connected thyristor network 3 or a Y-switch, and the second classification uses a thyristor network rectifier referred to as an R-switch 6. Both of these thyristor networks 3, 6 require a voltage selection network 4, 7 in order to shape the current through inductors 10 (FIG. 6A) and 10A and 10B (FIG. 6B). This current is time multiplexed with the thyristor switches 3, 6 in order to pass the current into the AC supply. This current adds with the current passed out of the converter 5 to produce sinusoidal currents into the AC supply. In FIGS. 6A and 6B, the thyristors in the networks 3, 6 are turned off via the AC supply voltage and the firing sequence used for the thyristors in the thyristor bridge. The thyristor turn-off function is only possible because the power is being passed into the AC supply as opposed to the DC.

Figure 12C:
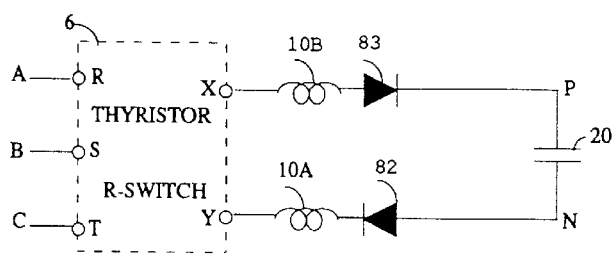

The second invention is shown in FIGS. 12A–12C where a converter bridge is used to pass power into the AC supply. There is only one circuit type for the converter bridge, that is a thyristor base converter bridge 5. There are two versions shown in FIGS. 12A and 12B respectively, the Y-switch 3 ad the R-switch 6. The voltage selection network of FIG. 12A is the same as that shown in FIG. 10A. The Y-switch 3 uses one inductor 10 at the output terminal Y of the Y-switch, whereas the R-switch uses two inductors 10A, 10B on the output terminals X and Y, so the Y-switch together with the voltage selection network is probably considered lower cost. However, the R-switch 6 with the two inductors 10A, 10B and the two switches identified as 80 and 81 allow for dual function where in the main mode the network is used for harmonic correction, and in the second mode of the occasional use in power flow reversal. As shown in FIG. 12B, a diode 82 is in series between the negative terminal Y of the rectifier switch and the negative DC voltage rail N and a diode 83 is in series between the positive terminal X of the rectifier switch and the positive DC voltage rail P, thus forming an asymmetrical H-bridge. The power reverse in the case is power drawn from the AC supply to the DC. This power reversing function is highlighted in FIG. 12C where the thyristor R-switch is essentially acting as a three phase thyristor rectifier with a positive terminal X and a negative terminal Y. This then passes through the inductors 10B and 10A, and through the diodes 83 and 82, going to the DC rail. This is a circuit that can pass power from the AC supply into DC.

FIGS. 13A–13I illustrate the operation of the resonant Y-switch network. FIG. 13A shows a Y-connected thyristor network $S_{3\phi}$ (same as switch 3) used with two resonant capacitors $C_p$ and $C_n$ connected to the positive and negative nodes P and N of the DC rail. The circuits of FIGS. 13B, 13C, 13D illustrate the switching states of this rectifier relative to phase A. This implementation of the harmonic correction circuit 2 using a resonant technique is shown in FIG. 8A. The basic harmonic correction unit 2 uses a resonant-mode 3-phase thyristor bridge 3 to draw resonant currents from the utility. These currents improve the line-current waveshape and lower the line-current thd down to 6% from 32%. A useful, low cost, converter topology consists of a 3-phase Y-connected scr switch (3 scr Y-switch) network, see FIG. 8A. This network is rates at less than 0.15 p.u. current and draws 0.06 p.u. power; the power being passed to the dc-rail. These low ratings and electrical stresses make the harmonic correction converters cheap, reliable and overall rectifier efficiency is close to that associated with a diode rectifier. This circuit is particularly useful when the ac supply frequency is high, e.g. 400 Hz or above 1 kHz. The higher the ac supply frequency, the smaller the line inductors become. The size of these inductors, being 0.2 to 0.4 p.u., can be prohibitive at lower frequencies. Modifications to the basic harmonic correction unit using, shown in FIGS. 8B–9D, alter the resonant action. This feature lowers the size of the line inductors and improve the line-current thd. This harmonic correction unit 2 lowers the input line current thd down to around 5% without lowering the power factor and without using input filters.

Figure 1A:
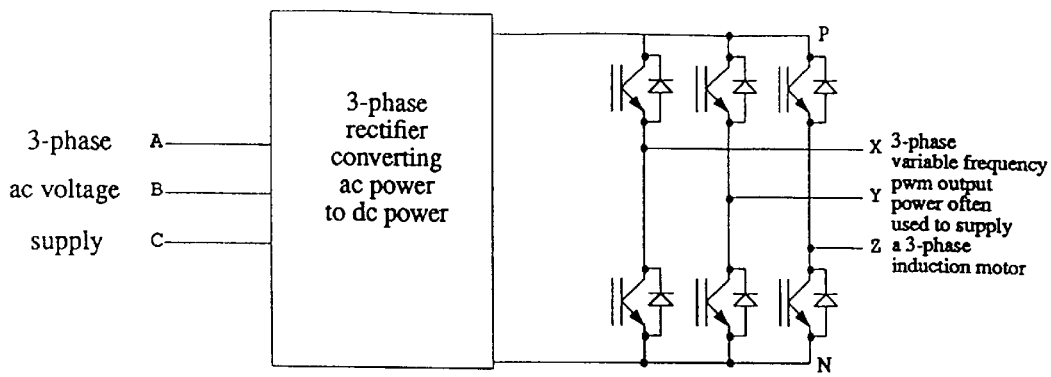
FIG. 1A is a schematic showing a prior art AC-DC-AC power supply.
Figure 1B:
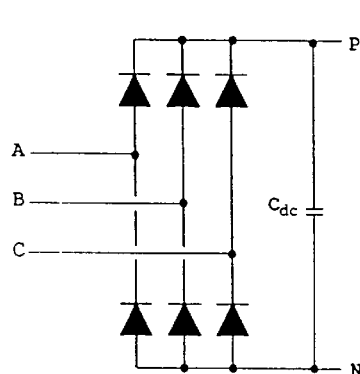
FIGS. 1B–F show various prior art embodiments of the 3-phase AC-DC rectifier shown in FIG. 1A.
Figure 1C:
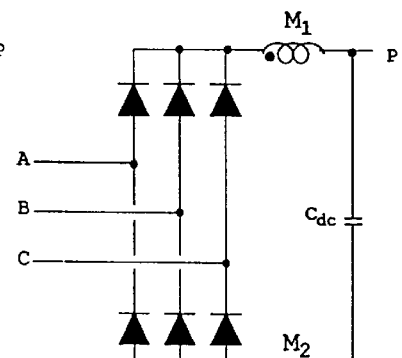
Figure 1D:
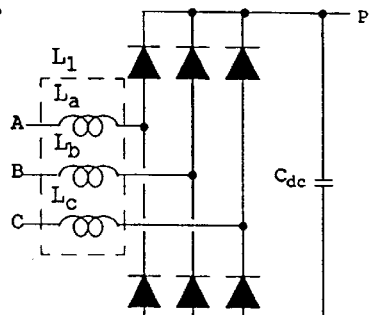
Figure 1E:
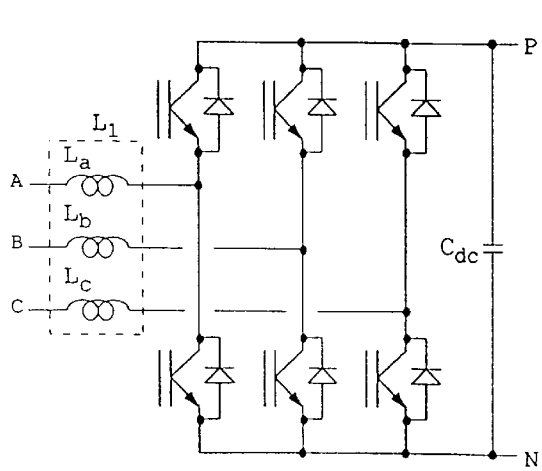
Figure 1F:
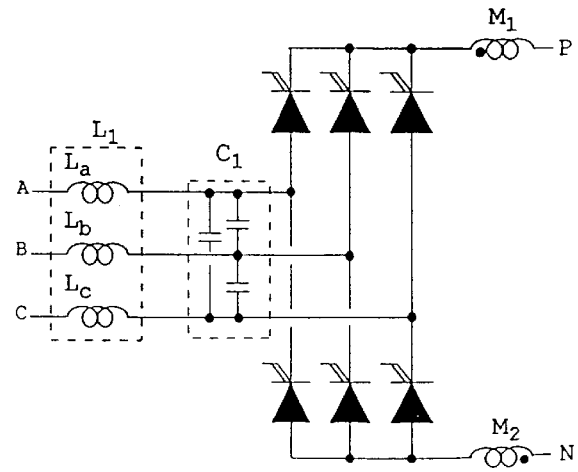
Figure 2A:
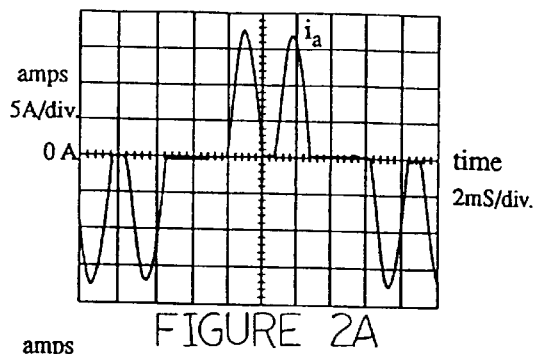
FIGS. 2A–D are graphs showing A currents drawn from an AC supply that are rich in harmonics, B AC supply currents drawn from the AC power supply of FIG. 1C, C AC supply currents drawn from the AC power supply of FIG. 1D and D AC line currents with harmonic correction as produced by prior art rectifiers.
Figure 2B:
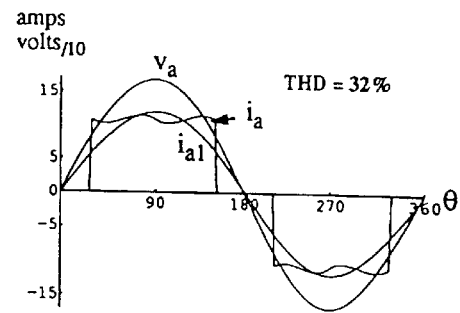
Figure 2C:
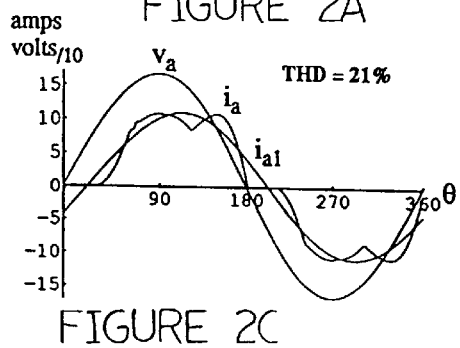
Figure 2D:
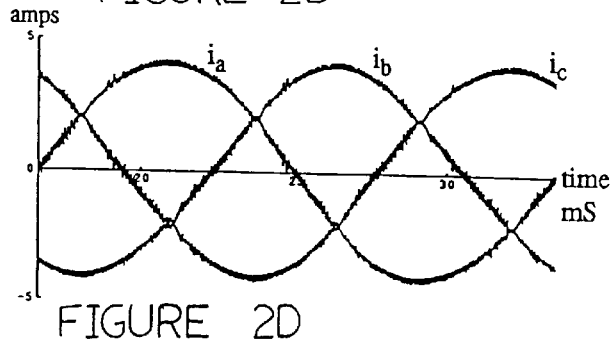
Figure 3A:
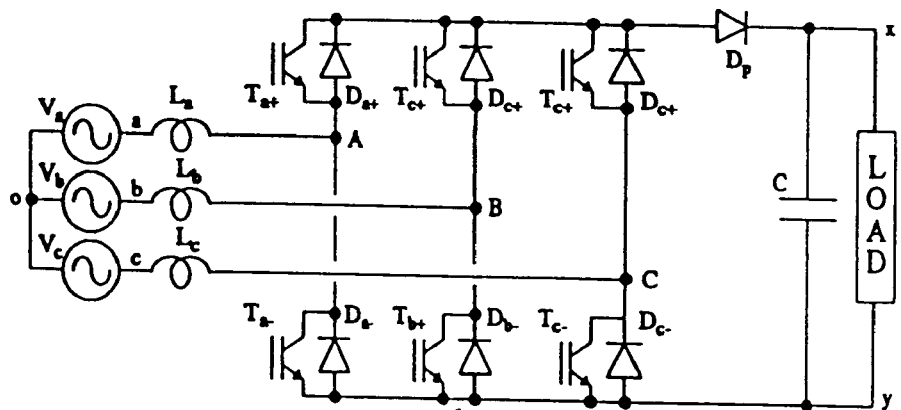
FIGS. 3A–C are schematics of prior art 3-phase pwm boost rectifiers, as described for example in Salmon June 1996 cited above.
Figure 3B:
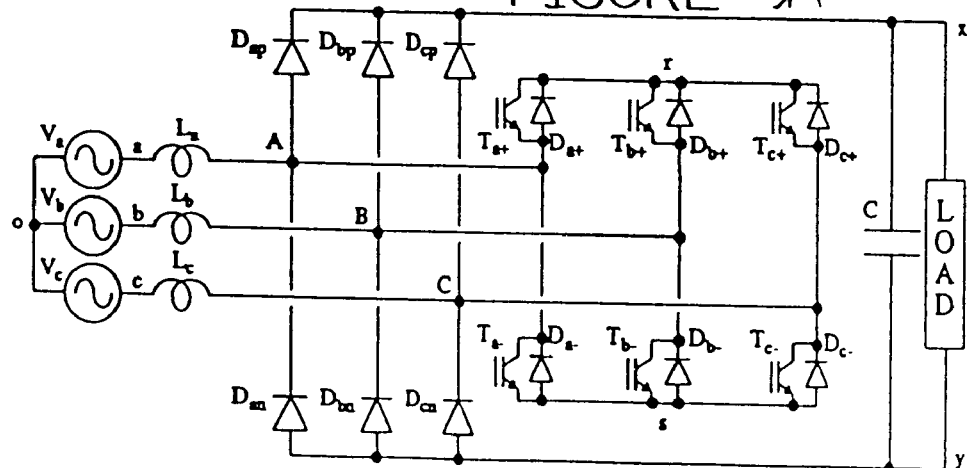
Figure 3C:
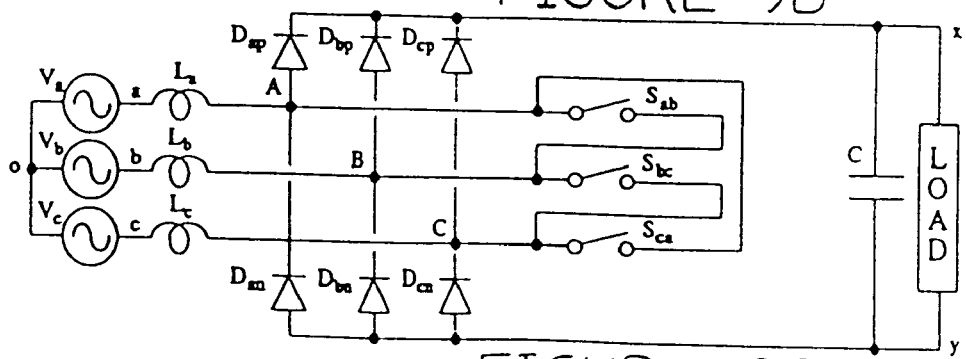
Figure 4A:
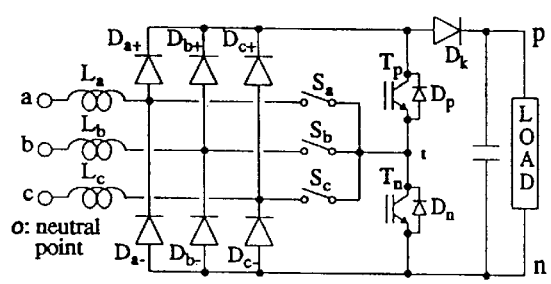
FIGS. 4A–D are schematics of prior art rectifiers using Y-connected 3-phase switches with AC line inductors.
Figure 4B:
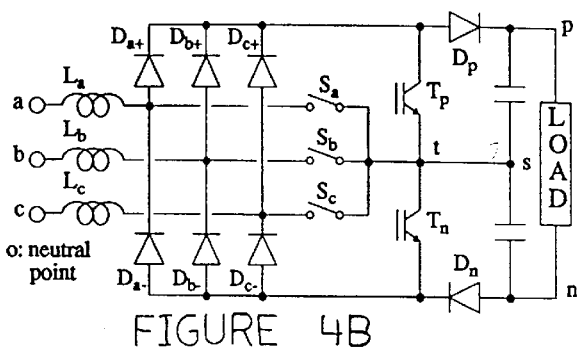
Figure 4C:
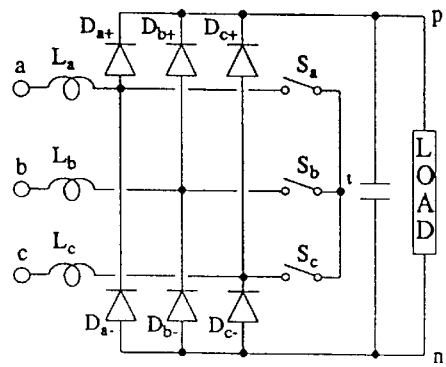
Figure 4D:
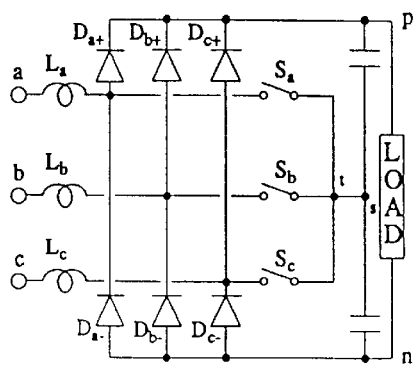

The basic function of the 3 scr Y-switch network $S_{3\phi}$ can be briefly summarized as drawing resonant current pulses from the ac-line during the zero current regions commonly associated with a standard 3-phase diode rectifier, as shown in FIG. 2B. These current pulses build up the line current in advance of the standard conduction periods associated with a 3-phase diode rectifier 1 without harmonic correction. The resonant action also allows a low stress commutation of the rectifier diodes and thyristors. This allows slow switching thyristors and diodes to be used as well as making the design and physical layout of the power converter topology non-critical.

The rectifier switching action takes place centered on the zero-voltage cross-over region of the 3-phase line-neutral voltages. Consider the zero-voltage cross-over region associated with phase-A: the point at which the phase-A line-neutral voltage is zero, passing from negative to positive, is designated as zero degrees.

−30°, or +330°, is the point at which the phase-B line-neutral voltage becomes more negative than the phase-A line-neutral voltage and commutation overlap occurs as the phase-A current transfers to phase-B, as shown in FIG. 13B. The duration of this commutation overlap is a function of the ac inductor magnitude, power level and the switching action of the 3 scr Y-switch network $S_{3\phi}$. Keeping the commutation overlap less than 30° is a desirable feature since the fundamental power factor is kept reasonably high and VAR production is controlled. Similarly, the phase-A thyristor is not triggered before the phase-A line neutral voltage zero voltage crossover, 0°, so as to minimize the leading power factor and to restrict VAR generation. After 0°, the "positive" phase-A thyristor is triggered. The resonant capacitors are initially charged with $v_{cn}$=0 and $v_{cp}$=$v_{dc}$. The resonant capacitor centre-tap voltage rises, see $v_{cn}$ in FIG. 13E, and the circuit switching state is shown in FIG. 13C. Since the two resonant capacitors are equal in magnitude, the resonant pulse drawn from phase-A splits equally between them and flow back to the C and B phases via the upper and lower DC-rails. This lowers the magnitude of the phase-C line current and increases the magnitude of the phase-B current. The slope of the resonant pulse current decreases as the capacitor centre-tap voltage increases above the phase-A voltage. Finally, $v_{cn}$ reaches $v_{dc\ and\ vcp}$ reaches zero. AT this point the phase-A diode $D_{a+}$ gets forward biased and the phase-a current transfers to the diode bridge, see FIG. 13D. This action naturally commutates the phase-A thyristor. 60° later the phase-C thyristors are turned on and the capacitor centre-tap voltage resonates to the negative rail, see FIGS. 13E and 13F. The phase-A line current in FIG. 13C shows that near sinusoidal currents are achieved, and FIG. 13H illustrates that the per-unit thyristor rms currents are low and have a high peak to rms ratio. These characteristics favour the use of the thyristor switches rather than IGBT, BJT or MOSFETS. FIG. 13I illustrates that the majority of the line currents are passing through the rectifier bridge rather than the switches, one of the main desirable features of this form of harmonic correction.

FIGS. 14A–14D illustrate the control signals that enable the thyristors in a Y-switch and R-switch to operate. For instance, signal $S_A$ in FIG. 14C is the enable signal shown for the phase A thyristors. When the signal is high, potential is supplied to turn on the thyristors in phase A, and when the signal is low the thyristors are off. These signals are shown relative to the phase voltages, phase A, phase B, phase C, as shown in the figure. The signals represent an enable signal and represent when the thyristors could be turned on. In other words, when $S_A$ is high, the thyristor can be on in that period, but the controller 100 would decide when in that period the thyristor would actually turn on. The voltage selection network determines when the thyristor are turned off. One possible scheme for the thyristor on time is to have the thyristors on for the duration of the enable period. However, the actual on time may be varied to regulate the DC rail voltage and minimize harmonic distortion under specific load conditions.

The current $i_{sa}$, see FIG. 13H, through the Phase A thyristors in the Y-connecting network 3 is small relative to the line current $i_A$. This illustrates the low current rating associated with the switches, and also illustrates the high peak current to RMS ratio associated with the Phase A thyristors, and highlights why it is advantageous to use thyristors in this network because they do have a high peak current to RMS ratio. That suits the use of these thyristors rather than the use of IBGT's. The IBGT's have a low peak current to RMS ratio.

The diode rectifier current identified as $i_{DA}$, see FIG. 13I, obviously has a higher RMS rating, and this illustrated the benefits of these harmonic correction circuits in that the switches have very low RMS ratings and the diodes have high RMS ratings. When the switches are the more expensive devices, these low ratings are preferable, but diodes with higher ratings are also preferable, because they are generally cheaper devices.

Table I identifies phase periods whereby thyristors could be turned on. There are two modes of control in the table.

PWM or pulse width modulated current control and on-time control. Pulse width modulated control means the voltage selection networks are switching at a high frequency to shape the current through the line inductors. However, this mode is not as suitable for the rectifier circuits because of the thyristors used, and not suitable for high frequency switching action. But this mode of control is suitable for the converter arrangements where the current is being controlled through inductors 10 or 10A and 10B on the DC side. The on-time control identified in the table is suitable for both circuits, ie. the converters and rectifiers. For the rectifiers, this is the preferred mode of control because the thyristors are generally slow switching devices with a large topology arrangement, so it is not beneficial to switch at a high frequency. Plus, the switching arrangement allows standard diode rectifiers to be used which are low cost, whereas, for the rectifier circuits, the PWM current control would not be suitable for low cost diode rectifiers.

The numbers under the column identified as $S_{on}$ refer to thyristors. For the first line on the table, in the zero to 30° phase open, thyristor 3A can be turned on during this period and in the 330 to 360 degree period, thyristor 3D could be turned on. For the on-time control, there are periods where you would not turn on these thyristors, so in those boxes no period is specified. For instance, for the 30° to 60° period, under the on-time control, you would not preferentially turn any thyristor on in that period, so the word none in the box means no thyristor would be turned on normally in that period.

Figure 15A:
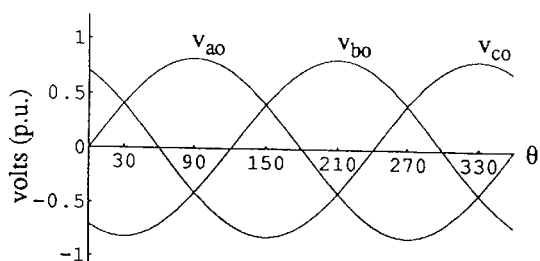
FIG. 15A is a graph showing line to neutral voltage signals over one complete cycle to define the phase information for DC to AC power conversion.

FIGS. 15A–16E describe two current mode controls. That is, PWM control is described in FIGS. 15A–15E and on-time control is described in FIGS. 16A–16E. The control in FIGS. 15A–15E is suitable for the converter circuits, the control in FIGS. 16A–16E is suitable for the rectifier circuits. FIG. 15A shows the line to neutral voltage to define the phase information. FIG. 15B shows the current that would flow through the inductor identified as element 10 in the circuits. This current has three times the supply frequency and the wave shape of this current is controlled using the voltage selection network 4 operating under high switching frequencies in order to shape this current. Often hysteresis current control is used to do this. The wave form in FIG. 15B identified as $i_t$ is the current through the inductor 10. It is an ideal wave shape in the figure. In practise it has high frequency ripple. If this is the current flowing through this inductor, the current flowing through inductor 11A is $i_p$, and the current flowing through inductor 11B is $i_n$. The result of the three currents, $i_p$, $i_t$ and $i_n$ would be the current $i_a$, which is the current flowing through Phase A, or into Phase A. This is fairly sinusoidal. $i_{a1}$ in FIG. 15C is the fundamental harmonic associated with that current wave shape. This has a total harmonic distortion THD of 4.7%. $i_{Sa}$ in FIG. 15D is the current flowing through the thyristors in phase a of the harmonic correction circuit. This current has a low rms value relative to the line current $i_a$. $i_{Ta}$ in FIG. 15E is the current flowing through the converter bridge in phase a. This current waveform illustrates that most of the line current flows through the converter bridge.

Figure 15B:
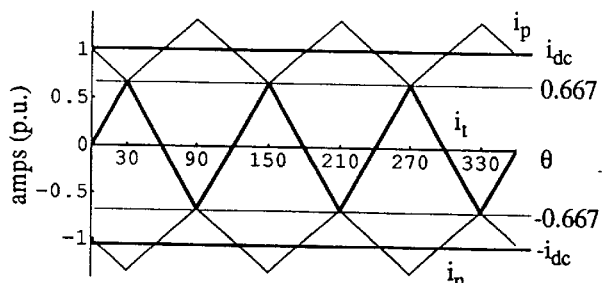
FIG. 15B is a graph showing current $i_L$ through inductor 10 in FIG. 12A through one complete cycle during DC to AC power conversion.

The currents given in FIG. 15B are per-unitized. $i_{dc}$, defined as 1 per unit (p.u.), shown in FIG. 15B is the average current flowing through the two DC rail inductors 11A and 11B. The action of the current wave shaping through inductors 10A, 10B, or inductor 10, producing a current $i_t$, also changes the wave shape of currents $i_p$ and $i_n$ as shown in the figure.

The magnitude of the current $i_t$ is defined as +0.667 and −0.667. This is obviously smaller than the current flowing into the AC supply, and illustrates that both the voltage selection network and the thyristor switch have very low current ratings. The thyristor R switch passes this triangle wave current into the three phase supply through terminals R, S and T in a time multiplex fashion, and the turning on of the thyristors in order to produce a time multiplexing is shown in Table 1 and shown in FIGS. 14A–14C.

Figure 16A:
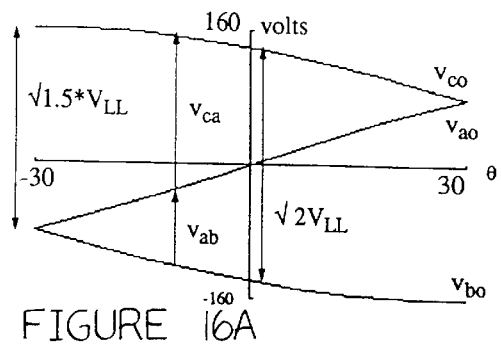
FIG. 16A is a graph showing line to neutral voltage signals at the cross-over from − to + during rectification using an embodiment of the invention.
Figure 16B:
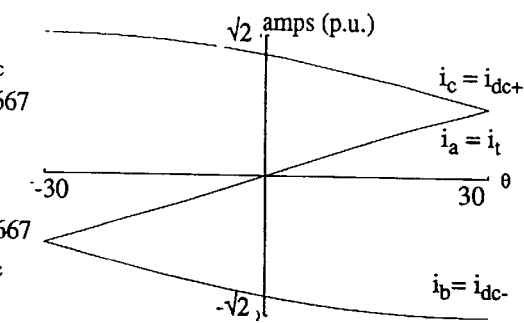
FIG. 16B is a graph showing current $i_A$ that would ideally flow through line A and which the invention attempts to approximate during rectification.
Figure 15C:
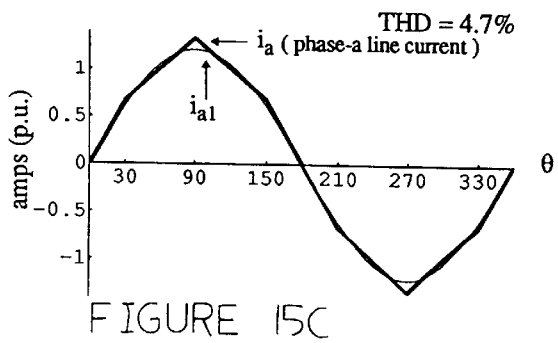
FIG. 15C is a graph showing current flowing into line A during DC to AC power conversion.
Figure 16C:
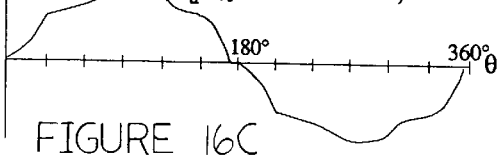
FIG. 16C is a graph showing actual phase A current in line A during rectification using an embodiment of the invention as shown in FIG. 5A.
Figure 15D:
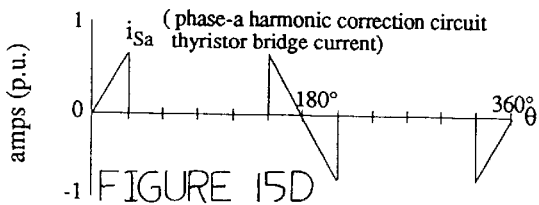
FIG. 15D shows the current flowing through the thyristors in phase A of the harmonic correction circuit during DC to AC power conversion.

The preferred embodiment for the control of the rectifier circuits is shown in FIGS. 16A–16C. FIG. 16A shows the phase voltages or line to neutral voltages over −30 and +30°. This figure is used to described the on-time control with reference to the control for the Phase A thyristors.

FIG. 16B shows the ideal currents that would flow in the circuits. More specifically, the current $i_a$ is ramping from minus to plus, going from −30° to +30°. That is the ideal current wave shape. The thyristors in the thyristor switches 3, 6 are turned on at zero degrees by the harmonic correction circuit controller 100, and kept on for up to about 30°. The turn-on/turn-off in practise may vary within that period (0 to 30°). The control signals for the thyristors producing the currents shown in FIG. 16C is shown in Table 1 in the column identified as the on-time control. For example, over zero to 30°, thyristor 3A will be turned on in the Table. This would result in the current shown in FIG. 16C for the Phase A current, that is over the period 0° to 30°. For the period −30° to 0°, the current decays down to 0, and often reaches 0 before the 0 degree point. This current decay is often identified as being the commutation overlap period associated with the diode bridge and the diode turning-off in Phase A. The harmonic correction network is not active over this −30° to 0° region. But the thyristors are on in the 0° to 30° region.

With all the thyristors controlled in an identical fashion, the resultant current drawn from the AC supply would be similar to that shown in FIG. 16C over 0 to 360°. That is the cycle of the AC mains voltage. This current is not sinusoidal, but with appropriate control, it can be made to be very close to sinusoidal at the desired power level. At the rated operating level, it is desirable to get the distortion down to about 5% of the total harmonic distortion.

Figure 16D:
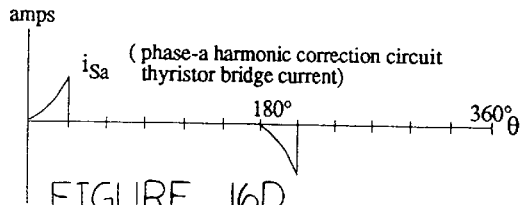
FIG. 16D shows the current flowing through the thyristors in phase A of the harmonic correction circuit during rectification.
Figure 15E:
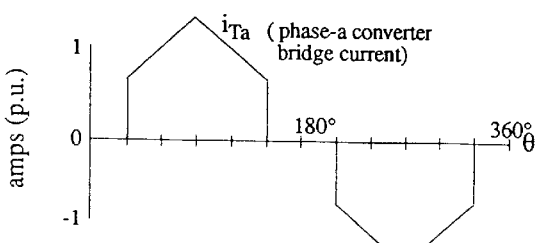
FIG. 15E shows the current flowing through the converter bridge in phase A during DC to AC power conversion.
Figure 16E:
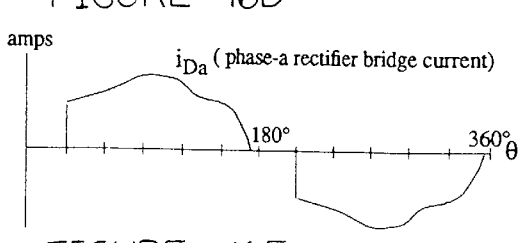
FIG. 16E shows the current flowing through the converter bridge in phase A during rectification.

$i_{Sa}$ in FIG. 16D is the current flowing through the thyristors in phase a of the harmonic correction circuit. This current obviously has a much lower rms value relative to the line current $i_a$. $i_{Da}$ in FIG. 16E is the current flowing through the rectifier bridge in phase a. This current waveform illustrates that most of the line current flows through the rectifier bridge.

Thyristor versions of earlier circuits as described in FIGS. 3A–4D cannot be implemented because the thyristors cannot be turned-off. That is why the voltage selection networks 4, 7 are needed. The function of the voltage selection networks will now be described.

The thyristor can be turned on at their gates under control of the harmonic correction circuit controller, but cannot be turned off at the gate, unlike IGBTs, MOSFETS and GTO's that can be turned off at the gate.

The resonant network of FIGS. 8A and 8B resonates between P and N. When the voltage resonates to one of the DC rails, the thyristors are turned off, because at this point currents flowing from the AC supply then get diverted up through the diode rectifier 1. And with the current being diverted away from the thyristors, the thyristors turn off.

The circuits in FIGS. 8C and 8D illustrate another mode of turning-off the thyristors. The resonant point at the centre tap of the two capacitors 23 and 24 in FIG. 8C or a similar point in FIG. 8D is separated from the thyristor bridge, and hence this voltage ramping up and down cannot be used to commutate off the thyristors. Instead, it is the physical turning off of the IGBT switches 31 and 32 that turn-off the thyristors. When the switch is turned-off the current flowing through the inductors 9A–9C in the AC line have no choice but to then transfer to the bridge rectifier 1.

In FIGS. 9A–9D, there are two potentials X and Y connected to the thyristor switch 6, and it is the action of the IGBTs turning-off after some defined conduction period which causes the current to discontinue from flowing through the thyristor switch 6 and hence flow through the rectifie bridge 1. So currents flowing through the line inductors 9A–9C are forced to flow away from the thyristor switch 6 by the switches 26, 27 and 28 turning off, and this switching action is the same for all the circuits in FIGS. 9A, 9B, 9C, 9D.

In FIGS. 10A–10D, the switches 31–39 are turned-on to allow current to flow through the thyristor bridge 3 so that the thyristors in the thyristor bridge 3 have to be triggered on and the switches 31–39 have to be turned on at the gate. The switches 31–39 are turned-on for a period of time in order to allow some kind of current wave shaping to happen, and when the switches are turned off, this forces the current to stop flowing through the IGBT switches 31–39 and also the thyristor bridge. Current that flows through the line inductors 9A–9C is again forced to flow through the rectifier bridge 1. This action forces the thyristors to turn-off. This action is similar in all circuits. The same thing happens for the thyristor R-switch 6 shown in FIGS. 11A–11E. So, the IGBT switches 31–39, 50–54 and 60–63 in FIGS. 10A–11E have an on-time and off-time control. The currents are time multiplexed by the IGBT switches to wave shape the currents from flowing out of the AC supply, and they also turn off the thyristors.

The present invention has important advantages over the prior art. The circuit shown in FIG. 11E shows one of the lowest cost versions of the thyristor bridges 6 which uses an R switch 6 together with what is shown as an IGBT switch 54. This can be compared in terms of performance with the Y-connected switch network using IGBTs shown in FIG. 4C. The circuit also functions the same as the circuit in FIG. 3C. Significant advantages in using the thyristor bridge include: the six IGBTs are replaced with six thyristors and one IGBT, and one of the significant improvements comes from the fact that thyristors have a high peak to rms ratio. The prior art using IGBTs have a limitation because the IGBTs are largely rated on the peak current that is flowing through the switches as opposed to the rms current. The IGBTs have a low peak current to rms ratio by their nature. The specifications for the thyristors matches the type of currents that flow through the harmonic correction circuits. This results in the ability to choose thyristors that have a lower rms current rating than IGBTs have. In the case of the invention in this patent, the thyristors have a much lower cost. This is also in addition to the fact that thyristors have a lower cost for a given current rating.

Thyristors are better suited for high power levels than IGBTs. The invention's use of thyristors can produce a benefit in enabling designs to be implemented that would be otherwise impossible with IGBTs.

The voltage selection network 7, since it is fairly small, and also since it can be implemented by using GTO switches can be easily designed to switch slowly. This slow switching action together with the slow switching action of the thyristors makes the harmonic correction circuit suitable for placing in parallel with the rectifier 1. This slow switching action means that standard low cost diode semi-conductors can be used in the rectifier 1. On the other hand, IGBTs by nature are fast switching devices and it is more difficult to slow down their switching speeds in order for them to be easily incorporated in parallel with the rectifier 1. Alternatively, expensive packaging is necessary to allow the circuit to cope with the faster switching.

Retrofit are easier with the thyristor bridges because of the less complicated design, so it is easy to fit the circuit to existing installations using diode bridges and it is also easier to design the converter to be connected to a product using a diode bridge, or thyristor bridge, for that matter, and hence, use a harmonic correction unit as an option which can be specified as a product option. The IGBTs of the prior art require more sophisticated gate drivers. So extra circuitry added to the IGBT designs to allow them to be used at reasonable power levels can push up the cost of IGBT networks.

A person skilled in the art could make immaterial modifications to the invention described in this patent document without departing from the essence of the invention that is intended to be covered by the scope of the claims that follow.

TABLE I thristor on-time control signals for circuit 3 in FIG. 5

| pwm current control | | on-time control | |
| --- | --- | --- | --- |
| phase span | $S_{on}$ | phase span | $S_{on}$ |
| 0°–30° | 3A | 0°–30° | 3A |
| 30°–60° | 3C | 30°–60° | none |
| 60°–90° | 3F | 60°–90° | 3F |
| 90°–120° | 3E | 90°–120° | none |
| 120°–150° | 3B | 120°–150° | 3B |
| –150°–180° | 3A | –150°–180° | none |
| 180°–210° | 3D | 180°–210° | 3D |
| 210°–240° | 3F | 210°–240° | none |
| 240°–270° | 3C | 240°–270° | 3C |
| 270°–300° | 3B | 270°–300° | none |
| 300°–330° | 3E | 300°–330° | 3E |
| 330°–360° | 3D | 330°–360° | none |

The embodiments of the invention in which an exclusive property or privilege is claimed are defined as follows:

1. A converter for converting AC power from a multi-phase AC power supply to DC power on a DC voltage rail, the multi-phase AC power supply including at least three AC power lines, the converter comprising:
   a rectifier bridged between the AC power supply and the DC voltage rail;
   an input line inductor on each AC power line connected in series between the AC power supply and the rectifier;
   a thyristor pair for each AC power line, each thyristor pair having a common point and an output, the common point being connected to the AC power line, each thyristor pair forming part of a link between the AC power line and a voltage source;
   the voltage source being selected from the group consisting of one of the other AC power lines, the DC voltage rail and a tap on the DC voltage rail; and
   a controller for the thyristor pair for time multiplexed control of flow of current through the thyristors to the AC power lines one at a time, to reduce harmonic content of current drawn from the AC power supply.

2. The converter of claim 1 in which the link between the AC power line and the voltage source includes a voltage selection network that is resonant with the input line inductors, such that as the voltage at the output of the thyristor pairs resonates up to the DC voltage rail, the thyristors are turned off.

3. The converter of claim 2 in which the outputs of the thyristor pairs are connected together to form a Y-connected thyristor switch having a common output point.

4. The converter of claim 3 in which the voltage selection network comprises:
   a pair of series connected capacitors connected across the DC voltage rail and having a common point connected to the common output point of the Y-connected thyristor switch.

5. The converter of claim 1 in which:
   the outputs of the thyristor pairs are connected together to form a Y-connected thyristor switch having a common output point;
   the link between the AC power line and the voltage source includes a voltage selection network that is resonant with the input line inductors; and
   the voltage selection network further comprises a switch at the common output point of the Y-connected thyristor switch for preventing current flow through the thyristors.

6. The converter of claim 3 in which the DC voltage rail includes a center tap and the voltage selection network comprises:
   a capacitor in series between the center tap and the common output point of the Y-connected thyristor switch.

7. The converter of claim 1 in which:
   the outputs of the thyristor inverter legs are connected together to form a Y-connected thyristor switch having a common output point;
   the link between the AC power line and the voltage source includes a voltage selection network that is resonant with the input line inductors;
   the DC voltage rail includes a center tap; and
   the voltage selection network further comprises a switch at the common output point of the Y-connected thyristor switch for preventing current flow through the thyristors.

8. The converter of claim 1 in which the link between the AC power line and the voltage source includes a voltage selection network that is resonant with the input line inductors and the outputs of the thyristor pairs are separated to form a rectifier switch having a positive output terminal and a negative output terminal.

9. The converter of claim 8 in which the voltage selection network comprises:
   a pair of series connected capacitors connected across the DC voltage rail and having a common point connected by a switch to each of the positive and negative output terminals of the rectifier switch.

10. The converter of claim 8 in which the DC voltage rail includes a center tap and the voltage selection network comprises:
    a capacitor in series between the center tap and each of the positive and negative terminals of the rectifier switch; and
    a switch between the capacitor and each of the positive and negative terminals of the rectifier switch.

11. The converter of claim 1 in which the link between the AC power line and the voltage source includes a voltage selection network for selecting one of the other AC power lines, the DC voltage rail and a tap on the DC voltage rail to be connected to the AC power line.

12. The converter of claim 11 in which the outputs of the thyristor pairs are connected together to form a Y-connected thyristor switch having a common output point.

13. The converter of claim 12 in which the voltage selection network comprises:

a first switch connected between the common output point and the positive DC voltage rail; and a second switch connected between the common output point and the negative DC voltage rail.

14. The converter of claim 12 in which the DC voltage rail has a center tap and the voltage selection network comprises:

a switch connected between center tap and the common output point of the Y-connected thyristor switch.

15. The converter of claim 12 in which the DC voltage rail has a center tap and the voltage selection network comprises:

a three level inverter bridge connected between the common point of the Y-connected thyristor switch and each of the positive and negative rails of the DC voltage rail and the center tap.

16. The converter of claim 11 in which the outputs of the thyristor pairs are separated to form a rectifier switch having a positive output terminal and a negative output terminal.

17. The converter of claim 16 in which the DC voltage rail has a center tap and the voltage selection network comprises:

a switch network connected between the center tap and the positive and negative output terminals of the rectifier switch.

18. The converter of claim 12 in which the voltage selection network comprises:

a first switch connected between the negative output terminal of the rectifier switch and the positive DC voltage rail; and a second switch connected between the positive output terminal of the rectifier switch and the negative DC voltage rail.

19. The converter of claim 16 in which the DC voltage rail has a center tap and the voltage selection network comprises:

a split three level inverter bridge connected between the positive and negative output terminals of the rectifier switch and each of the positive and negative rails of the DC voltage rail and the center tap.

20. The converter of claim 16 in which the voltage selection network comprises:

a switch connected between the positive and negative output terminals of the rectifier switch.

* * * * *

UNITED STATES PATENT AND TRADEMARK OFFICE
CERTIFICATE OF CORRECTION

PATENT NO. : 5,936,855
DATED : August 10, 1999
INVENTOR(S) : J.C. Salmon

It is certified that error appears in the above-identified patent and that said Letters Patent is hereby corrected as shown below:

| COLUMN | LINE | |
|---|---|---|
| 18 (Claim 7, | 31 line 2) | "thyristor inverter legs" should read --thyristor pair-- |
| 20 (Claim 18, | 4 line 1) | "claim 12" should read --claim 16-- |

Signed and Sealed this

Thirtieth Day of May, 2000

Attest:

Q. TODD DICKINSON

*Attesting Officer*          *Director of Patents and Trademarks*